(12) United States Patent
Cha et al.

(10) Patent No.: US 12,232,108 B2
(45) Date of Patent: Feb. 18, 2025

(54) METHOD FOR TRANSMITTING AND RECEIVING SIGNAL IN WIRELESS COMMUNICATION SYSTEM, AND APPARATUS SUPPORTING SAME

(71) Applicant: LG Electronics Inc., Seoul (KR)

(72) Inventors: Hyunsu Cha, Seoul (KR); Kijun Kim, Seoul (KR); Hyunsoo Ko, Seoul (KR); Haewook Park, Seoul (KR); Jeongsu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 336 days.

(21) Appl. No.: 17/910,269

(22) PCT Filed: Mar. 23, 2021

(86) PCT No.: PCT/KR2021/003554
§ 371 (c)(1),
(2) Date: Sep. 8, 2022

(87) PCT Pub. No.: WO2021/194206
PCT Pub. Date: Sep. 30, 2021

(65) Prior Publication Data
US 2023/0113784 A1    Apr. 13, 2023

(30) Foreign Application Priority Data
Mar. 23, 2020 (KR) .......... 10-2020-0035195

(51) Int. Cl.
H04W 72/1268 (2023.01)
H04W 64/00 (2009.01)
H04W 72/23 (2023.01)

(52) U.S. Cl.
CPC ....... *H04W 72/1268* (2013.01); *H04W 64/00* (2013.01); *H04W 72/23* (2023.01)

(58) Field of Classification Search
CPC .. H04W 72/1268; H04W 72/73; H04W 64/00
USPC ....................................... 370/329
See application file for complete search history.

(56) References Cited

U.S. PATENT DOCUMENTS

2014/0094188 A1   4/2014   Kazmi et al.
2014/0206385 A1   7/2014   Siomina et al.

OTHER PUBLICATIONS

Huawei & HiSilicon, "Considerations on UL procedures for NR positioning," R2-1914979, 3GPP TSG-RAN WG2 Meeting #108, Reno, US, Nov. 18-22, 2019, 8 pages.

(Continued)

*Primary Examiner* — Anthony Mejia
(74) *Attorney, Agent, or Firm* — Fish & Richardson P.C.

(57) ABSTRACT

Various embodiments relate to a next-generation wireless communication system for supporting a higher data transfer rate or the like beyond the $4^{th}$ generation (4G) wireless communication system. According to various embodiments, provided are a method for transmitting and receiving a signal in a wireless communication system and an apparatus supporting same, and various other embodiments may also be provided.

13 Claims, 30 Drawing Sheets

(56) References Cited

OTHER PUBLICATIONS

Intel Corporation, "On Radio-Layer Procedures for NR Positioning," R1-1904322, Presented at 3GPP TSG RAN WG1 Meeting #96bis, Xi'an, China, Apr. 8-12, 2019, 7 pages.
International Search Report in International Appln. No. PCT/KR2021/003554, dated Jul. 15, 2021, 8 pages (with English translation).
Oppo, "Discussion on Physical-Layer Procedures for NR Positioning," R1-1911850, Presented at 3GPP TSG RAN WG1 #99, Reno, USA, Nov. 18-22, 2019, 6 pages.

FIG. 13
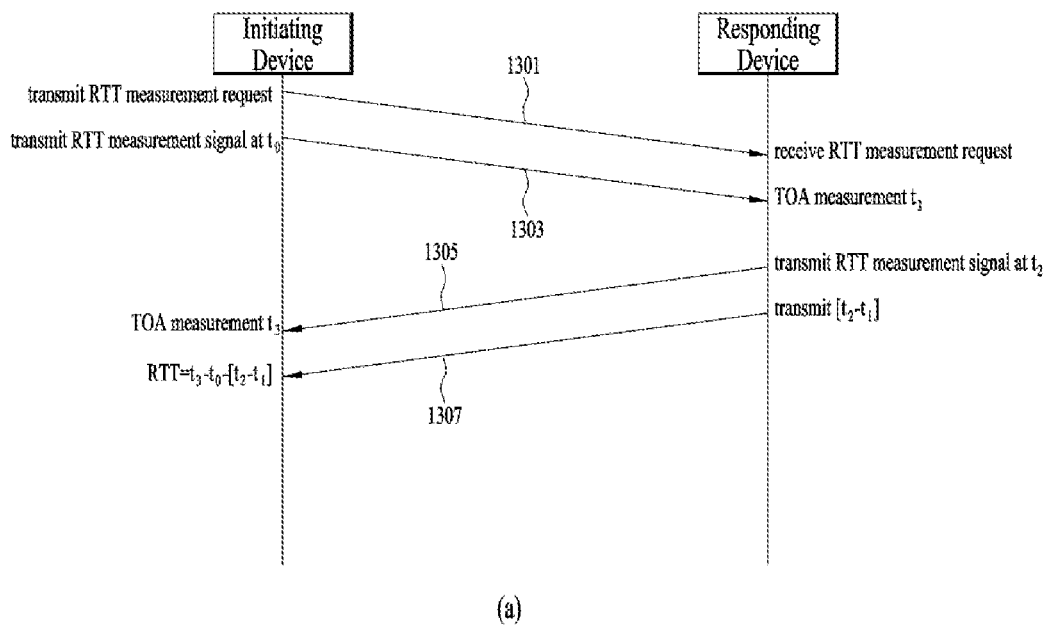
(a)
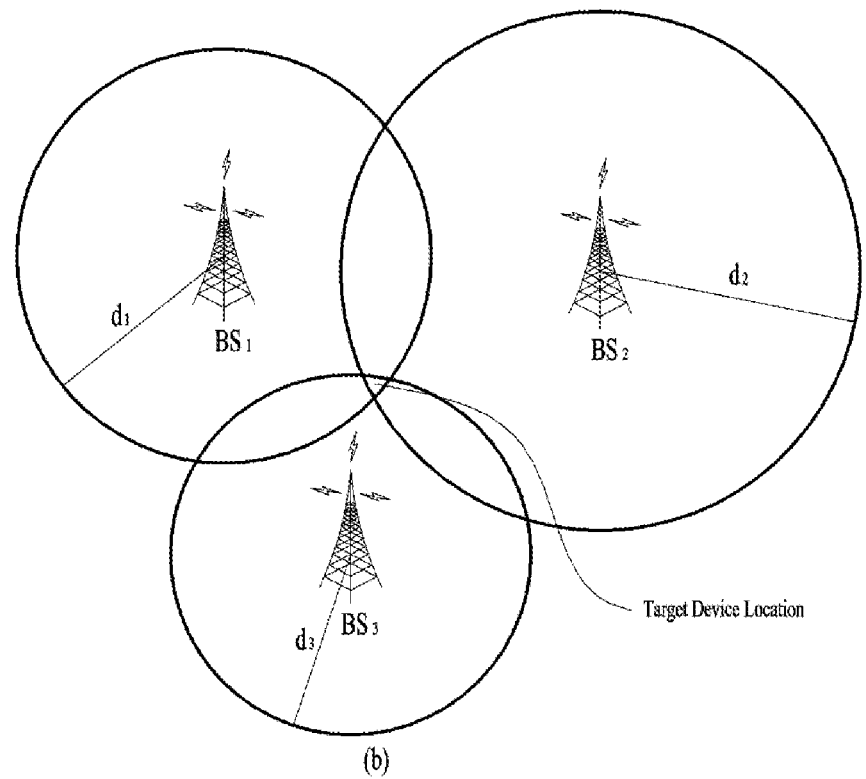
(b)

METHOD FOR TRANSMITTING AND RECEIVING SIGNAL IN WIRELESS COMMUNICATION SYSTEM, AND APPARATUS SUPPORTING SAME

CROSS-REFERENCE TO RELATED APPLICATIONS

This application is a National Stage application under 35 U.S.C. § 371 of International Application No. PCT/KR2021/003554, filed on Mar. 23, 2021, which claims the benefit of Korean Application No. 10-2020-0035195, filed on Mar. 23, 2020. The disclosures of the prior applications are incorporated by reference in their entirety.

TECHNICAL FIELD

Various embodiments are related to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a positioning method based on timing measurement and an apparatus supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method and apparatus for transmitting and receiving a signal in a wireless communication system.

According to various embodiments, a method carried out by an apparatus in a wireless communication system may be provided.

According to various embodiments, the method may include receiving first configuration information related to a first timing advance (TA); receiving second configuration information related to a reference signal (RS) for positioning, wherein the second configuration information includes at least one of (i) information related to an RS resource or (ii) information related to an RS resource set; and transmitting the RS at an uplink (UL) transmission timing based on the second configuration information.

Based on comparison between the first TA and a second TA related to the UL transmission timing, information related to the second TA may be transmitted.

According to various embodiments, the information related to the second TA may include information about a difference value between the first TA and the second TA.

According to various embodiments, the RS may be a plurality of periodically or semi-persistently transmitted RSs.

According to various embodiments, the second TA may be a plurality of second TAs obtained with respect to the plurality of RSs.

According to various embodiments, at least one of information about an RS resource of an RS related to each of the plural second TAs or the information about the RS resource set may be transmitted.

According to various embodiments, the second TA may be obtained in the same manner as the first TA, based on (i) obtaining of a time window related to maintenance of a TA and (ii) the UL transmission timing being included in the time window.

According to various embodiments, at least one of (i) the RS resource being a plurality of RS resources or (ii) the RS resource set being a plurality of RS resource sets may be satisfied.

According to various embodiments, at least one of (i) obtaining of the time window for the plural RS resources or (ii) obtaining of the time window for the plurality of RS resource sets may be satisfied.

According to various embodiments, the method may further include receiving information related to a TA command for updating the first TA.

According to various embodiments, the TA command may be disregarded for transmission of the RS, based on (i) obtaining of the time window and (ii) the UL transmission timing being included in the time window.

According to various embodiments, the information related to the second TA may include a first bit field as to whether the first TA is equal to the second TA, based on reception of a confirmation request as to whether the first TA is equal to the second TA.

According to various embodiments, the first bit field having a first value may be mapped to a case in which the first TA is equal to the second TA.

According to various embodiments, the first bit field having a second value may be mapped to a case in which the first TA is different from the second TA.

According to various embodiments, the UL transmission timing may be obtained based on a downlink (DL) reception timing and the second TA.

According to various embodiments, information including a second bit field as to whether the DL reception timing is changed may be transmitted.

According to various embodiments, the second bit field having a first value may be mapped to a case in which the DL reception timing is not changed.

According to various embodiments, the second field having a second value may be mapped to a case in which the DL reception timing is changed.

According to various embodiments, a user equipment (UE) configured to operate in a wireless communication system may be provided.

According to various embodiments, the UE may include a transceiver, and one or more processors connected to the transceiver.

According to various embodiments, the one or more processors may be configured to: receive first configuration information related to a first timing advance (TA); receive second configuration information related to a reference signal (RS) for positioning, wherein the second configuration information includes at least one of (i) information related to an RS resource or (ii) information related to an RS resource set; and transmit the RS at an uplink (UL) transmission timing based on the second configuration information.

According to various embodiments, based on comparison between the first TA and a second TA related to the UL transmission timing, information related to the second TA may be transmitted.

According to various embodiments, the second TA may be obtained in the same manner as the first TA, based on (i) obtaining of a time window related to maintenance of a TA and (ii) the UL transmission timing being included in the time window.

According to various embodiments, the one or more processors may be configured to communicate with one or more of a UE, a network, and an autonomous vehicle other than a vehicle in which the UE is included.

According to various embodiments, a method carried out by an apparatus in a wireless communication system may be provided.

According to various embodiments, the method may include transmitting first configuration information related to a first timing advance (TA); transmitting second configuration information related to a reference signal (RS) for positioning, wherein the second configuration information includes at least one of (i) information related to an RS resource or (ii) information related to an RS resource set; and receiving the RS related to an uplink (UL) transmission timing and the second configuration information.

According to various embodiments, based on comparison between the first TA and a second TA related to the UL transmission timing, information related to the second TA may be received.

According to various embodiments, a base station operating in a wireless communication system may be provided.

According to various embodiments, the base station may include a transceiver, and one or more processors connected to the transceiver.

According to various embodiments, the one or more processors may be configured to: transmit first configuration information related to a first timing advance (TA); transmit second configuration information related to a reference signal (RS) for positioning, wherein the second configuration information includes at least one of (i) information related to an RS resource or (ii) information related to an RS resource set; and receive the RS related to an uplink (UL) transmission timing and the second configuration information.

According to various embodiments, based on comparison between the first TA and a second TA related to the UL transmission timing, information related to the second TA may be received.

According to various embodiments, an apparatus operating in a wireless communication system may be provided.

According to various embodiments, the apparatus may include one or more processors, and one or more memories storing one or more instructions to cause the one or more processors to carry out a method.

According to various embodiments, the method may include receiving first configuration information related to a first timing advance (TA); receiving second configuration information related to a reference signal (RS) for positioning, wherein the second configuration information includes at least one of (i) information related to an RS resource or (ii) information related to an RS resource set; and transmitting the RS at an uplink (UL) transmission timing based on the second configuration information.

According to various embodiments, based on comparison between the first TA and a second TA related to the UL transmission timing, information related to the second TA may be transmitted.

According to various embodiments, a processor-readable medium storing one or more instructions to cause one or more processors to carry out a method may be provided.

According to various embodiments, the method may include receiving first configuration information related to a first timing advance (TA); receiving second configuration information related to a reference signal (RS) for positioning, wherein the second configuration information includes at least one of (i) information related to an RS resource or (ii) information related to an RS resource set; and transmitting the RS at an uplink (UL) transmission timing based on the second configuration information.

According to various embodiments, based on comparison between the first TA and a second TA related to the UL transmission timing, information related to the second TA may be transmitted.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

Advantageous Effects

According to various embodiments, a signal may be effectively transmitted and received in a wireless communication system.

According to various embodiments, positioning may be effectively performed in a wireless communication system.

According to various embodiments, a miscommunication problem between a UE and a network, for a transmission timing and/or a TA may be solved.

According to various embodiments, accuracy of timing measurement for positioning may be improved.

According to various embodiments, positioning accuracy may be improved.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

BRIEF DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 13 is a diagram illustrating a multi-round trip time (multi-RTT) positioning method to which various embodiments are applicable.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System

1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
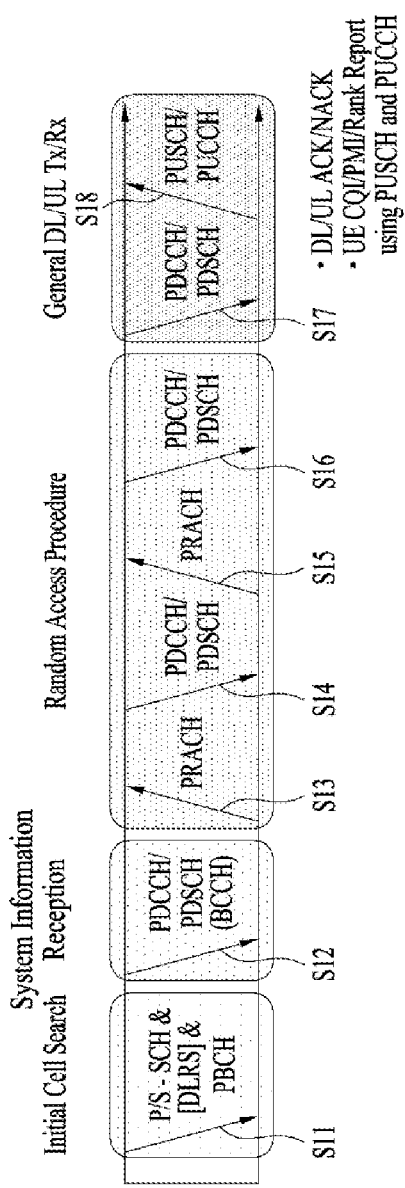
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resource

Figure 2:
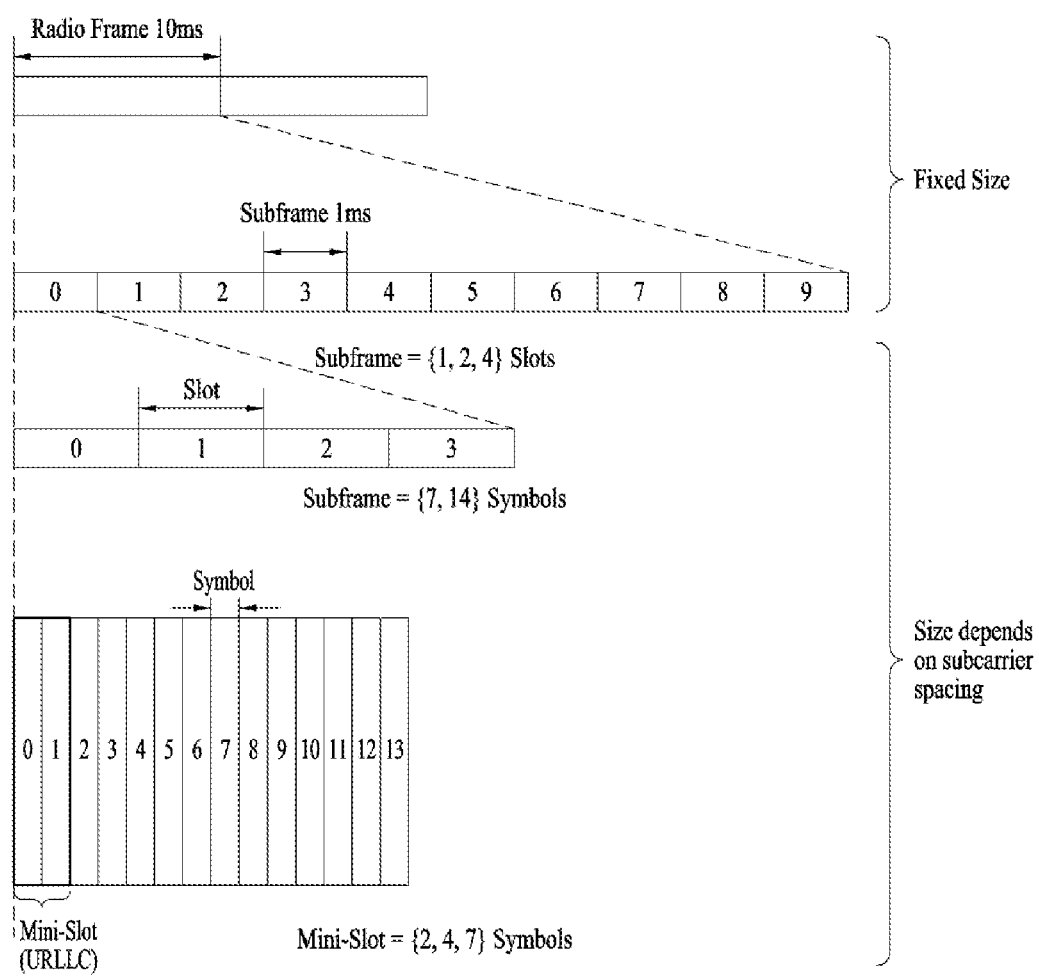
FIG. 2 is a diagram illustrating a radio frame structure in a new radio access technology (NR) system to which various embodiments are applicable.

FIG. 2 is a diagram illustrating a radio frame structure in an NR system to which various embodiments are applicable.

The NR system may support multiple numerologies. A numerology may be defined by a subcarrier spacing (SCS) and a cyclic prefix (CP) overhead. Multiple SCSs may be derived by scaling a default SCS by an integer N (or µ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part (BWP), µ and a CP are obtained from RRC parameters provided by the BS.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c = 1/(\Delta f_{max} * N_f)$ where $\Delta f_{max} = 480*10^3$ Hz and a value $N_f$ related to a fast Fourier transform (FFT) size or an inverse fast Fourier transform (IFFT) size is given as $N_f = 4096$. $T_c$ and $T_s$ which is an LTE-based time unit and sampling time, given as $T_s = 1/((15 \text{ kHz})*2048)$ are placed in the following relationship: $T_s/T_c = 64$. DL and UL transmissions are organized into (radio) frames each having a duration of $T_f = (\Delta f_{max} * N_f/100) * T_c = 10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^μ_s \in \{0, \ldots, N^{slot,μ}_{frame}-1\}$ in an increasing order in a subframe, and with $n^μ_{s,f} \in \{0, \ldots, N^{slot,μ}_{frame}-1\}$ in an increasing order in a radio frame. One slot includes $N^μ_{symb}$ consecutive OFDM symbols, and $N^μ_{symb}$ depends on a CP. The start of a slot $n^μ_s$ in a subframe is aligned in time with the start of an OFDM symbol $n^μ_s*N^μ_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

In the above tables, $N^{slot}_{symb}$ represents the number of symbols in a slot, $N^{frame,μ}_{slot}$ represents the number of slots in a frame, and $N^{subframe,μ}_{slot}$ represents the number of slots in a subframe.

In the NR system to which various embodiments are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
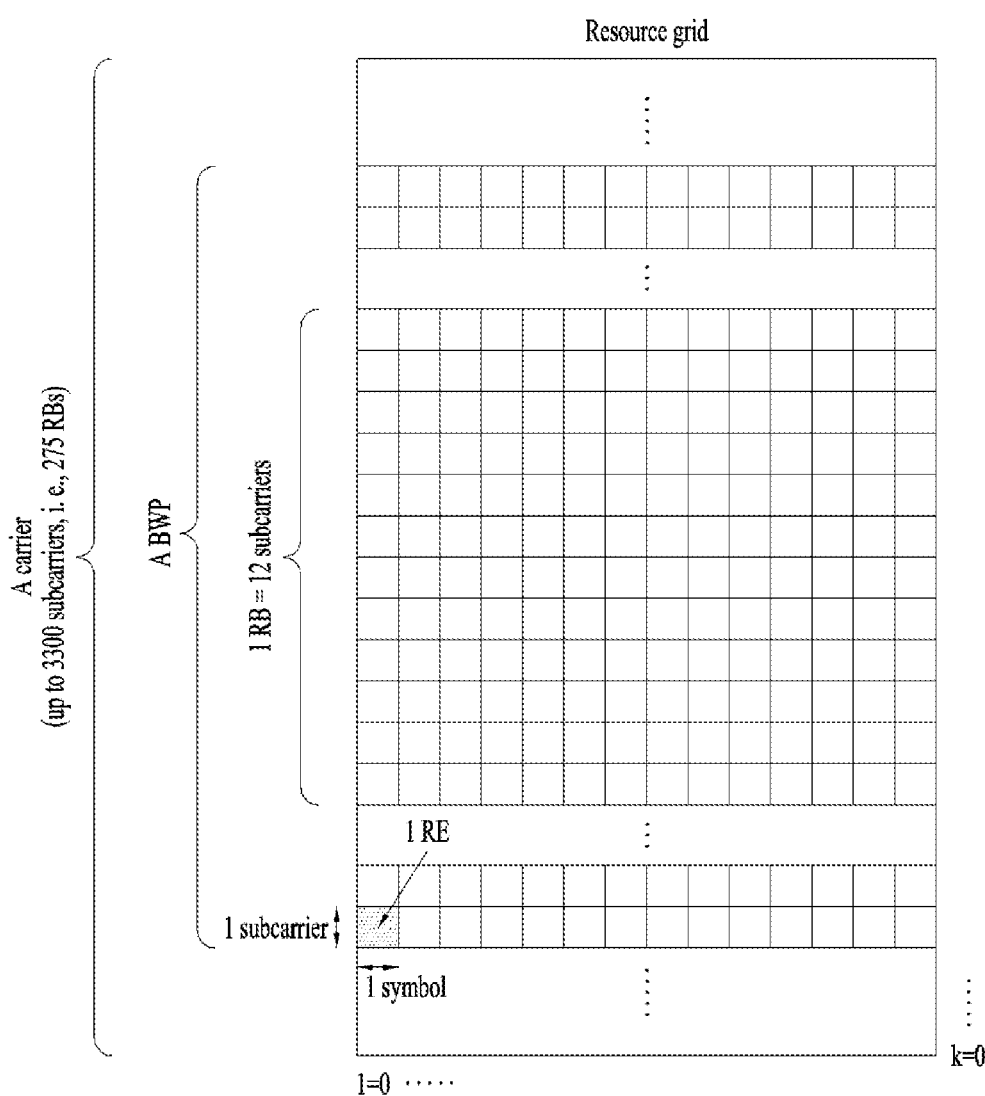
FIG. 3 illustrates an exemplary resource grid to which various embodiments are applicable.

FIG. 3 illustrates an exemplary resource grid to which various embodiments are applicable.

Referring to FIG. 3, for each subcarrier spacing (SCS) and carrier, a resource grid is defined as $14 \times 2^μ$ OFDM symbols by $N_{grid}^{size,μ} \times N_{SC}^{RB}$ subcarriers, where $N_{grid}^{size,μ}$ is indicated by RRC signaling from the BS. $N_{grid}^{size,μ}$ may vary according to an SCS configuration μ and a transmission direction, UL or DL. There is one resource grid for an SCS configuration μ, an antenna port p, and a transmission direction (UL or DL). Each element of the resource grid for the SCS configuration μ and the antenna port p is referred to as an RE and uniquely identified by an index pair (k, l) where k represents an index in the frequency domain, and l represents a symbol position in the frequency domain relative to a reference point. The RE (k, l) for the SCS configuration μ and the antenna port p corresponds to a physical resource and a complex value $a_{k,l}^{(p,μ)}$. An RB is defined as $N_{SC}^{RB}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
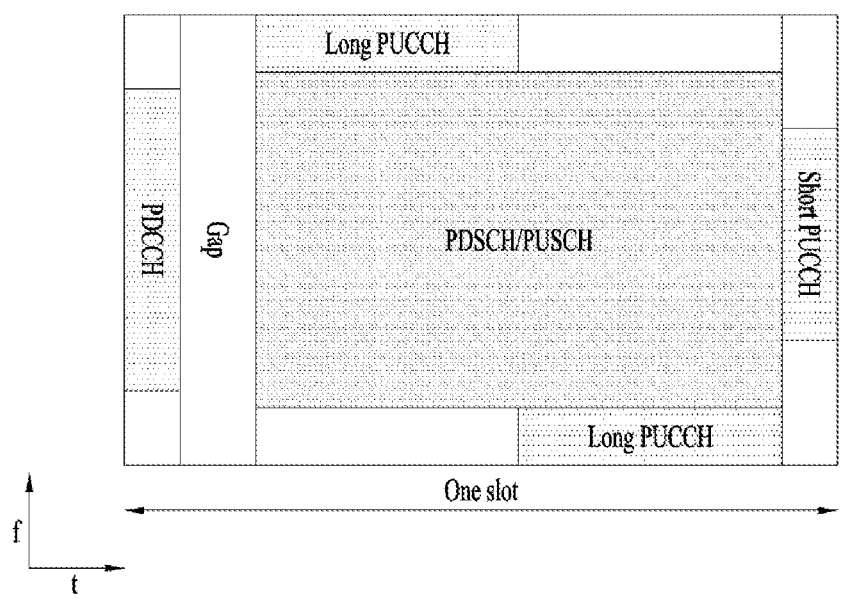
FIG. 4 is a diagram illustrating mapping of physical channels in a slot, to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/

NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

1.4. UL-DL Timing Relationship

Timing advance maintenance on UL will now be described.

In a system based on OFDM technology, a time required for a signal transmitted by a UE to reach a BS may vary depending on the radius of a cell, the location of the UE within the cell, and/or the moving speed of the UE. That is, if the BS does not separately manage transmission signal timings of respective UEs, there is a possibility that a transmission signal of a UE may interfere with signals transmitted by other UEs, and thus an error rate of signals received by the BS increases.

More specifically, a time consumed for a signal transmitted by a UE attempting to perform transmission at a cell edge to arrive at the BS will be longer than a time required for a signal transmitted by a UE at the center of the cell to arrive at the BS. Conversely, a time required for a signal transmitted by the UE located at the center of the cell to arrive at the BS will be relatively shorter than that of the UE located at the edge of the cell.

Since data or signals that all UEs in the cell transmit should be received within every valid time boundary in order to prevent interference in terms of the BS, the BS needs to appropriately adjust transmission timings of the signals transmitted by the UEs according to situations of the UEs and this adjustment is referred to as timing advance management.

One method of managing a timing advance may be a random access operation. That is, the random access operation causes the BS to receive a random access preamble transmitted by the UE. The BS calculates a timing advance value to make a transmission timing of the UE faster or slower using information about the received random access preamble. Then, the BS informs the UE of the calculated timing advance value through a random access response. The UE updates a UL transmission timing using the timing advance value.

As another method, the BS receives a sounding reference signal (SRS) periodically or randomly transmitted by the UE and calculates the timing advance value for the UE through the received signal. The BS informs the UE of the timing advance value and then the UE updates a transmission timing thereof.

As described above, the BS measures the transmission timing of the UE through the random access preamble or the SRS, calculates a timing value to be corrected, and informs the UE of the timing value to be corrected. The timing advance value (i.e., timing value to be corrected) transmitted by the BS to the UE is referred to as a timing advance command (TAC). The TAC is processed in a MAC layer. Since the UE is not always located at a fixed position, the transmission timing of the UE is changed at every time according to the moving speed of the UE and the location of the UE.

In this regard, upon receiving the TAC once from the BS, the UE needs to assume that the TAC is not always valid for an infinite time but the TAC is valid only for a specific time. A timing advance timer (TAT) is used for this purpose. That is, upon receiving the TAC from the BS, the UE starts the TAT. The UE assumes that a UL timing thereof is synchronized with the BS when the TAT is in operation. The value of the TAT may be transmitted through an RRC signal such as system information or radio bearer reconfiguration. Upon receiving a new TAC from the BS while the TAT is in operation, the UE restarts the TAT. When the TAT expires or the TAT does not operate, the UE does not transmit any UL signals, such as PUSCH and PUCCH signals, except for the random access preamble, under the assumption that the UL timing of the UE is not synchronized with the BS.

Figure 5:
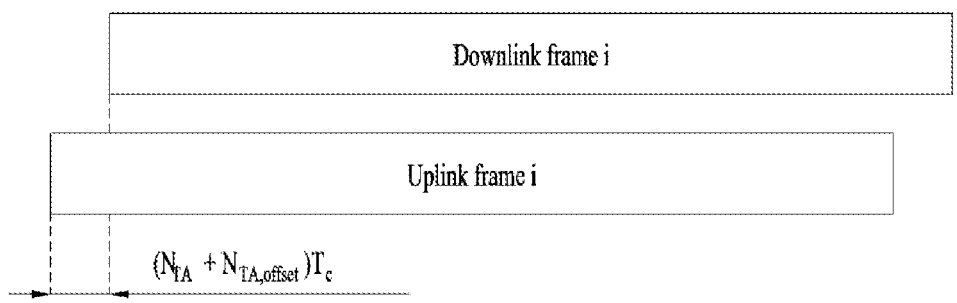
FIG. 5 is a diagram illustrating an exemplary UL-DL timing relationship to which various embodiments are applicable.

FIG. 5 is a diagram illustrating an exemplary UL-DL timing relationship applicable to various embodiments of the present disclosure.

Referring to FIG. 5, a UE starts to transmit UL frame i $T_{TA}(=(N_{TA}+N_{TA,offset})T_c)$ seconds before a DL radio frame corresponding to UL frame i. However, $T_{TA}=0$ exceptionally for a msgA transmission on a PUSCH. $T_c=0.509$ ns.

The UE may be provided with a value $N_{TA,offset}$ of a timing advance (TA) offset for a serving cell by n-TimingAdvanceOffset for the serving cell. When the UE is not provided with n-TimingAdvanceOffset for the serving cell, the UE may determine a default value $N_{TA,offset}$ of the TA offset for the serving cell.

In the case of a random access response, a TA command, TA for a timing advance group (TAG) indicates $N_{TA}$ values by index values of $T_A$=0, 1, 2, . . . , 3846, where an amount of the time alignment for a TAG with an SCS of $2^\mu*15$ kHz is $N_{TA}$ ($=T_A*16*64/2^\mu$). $N_{TA}$ is relative to the SCS of a first UL transmission from the UE after reception of a random access response.

In other cases, a $T_A$ command, $T_A$ for a TAG indicates adjustment of a current $N_{TA}$ value, $N_{TA\_old}$ to a new $N_{TA}$ value, $N_{TA\_new}$ by index values of $T_A$ (=0, 1, 2, . . . , 63), where for a SCS of $2^\mu*15$ kHz, $N_{TA\_new}=N_{TA\_old}+(T_A-31)*16*64/2^\mu$.

1.5. Beam Management (BM)

BM is a series of processes for acquiring and maintaining a set of BS (or transmission and reception point (TRP)) beams and/or UE beams available for DL and UL transmissions/receptions. BM may include the following processes and terminology.

Beam measurement: The BS or the UE measures the characteristics of a received beamformed signal.

Beam determination: The BS or the UE selects its Tx beam/reception (Rx) beam.

Beam sweeping: A spatial domain is covered by using Tx beams and/or Rx beams in a predetermined manner during a predetermined time interval.

Beam report: The UE reports information about a beamformed signal based on a beam measurement.

The BM process may be divided into (1) a DL BM process using an SSB or a CSI-RS and (2) a UL BM process using a sounding reference signal (SRS). Further, each BM process may include Tx beam sweeping for determining a Tx beam and Rx beam sweeping for determining an Rx beam.

DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 5 describes an example of a TCI-State IE. The TC-State IE is related to a QCL type corresponding to one or two DL RSs.

TABLE 5

TCI-State
The IE TCI-State associates one or two DL reference signals with a corresponding quasi-colocation (QCL) type.
TCI-State information element

```
-- ASN1START
-- TAG-TCI-STATE-START
TCI-State ::=         SEQUENCE {
   tci-StateId        TCI-StateId,
   qcl-Type1          QCL-Info,
   qcl-Type2          QCL-Info
                      OPTIONAL, -- Need R
   ...
}
QCL-Info ::=          SEQUENCE {
   cell               ServCellIndex
                      OPTIONAL, -- Need R
   bwp-Id             BWP-Id
                      OPTIONAL, -- Cond CSI-RS-Indicated
   referenceSignal    CHOICE {
      csi-rs          NZP-CSI-RS-ResourceId,
      ssb             SSB-Index
   },
   qcl-Type           ENUMERATED {typeA, typeB, typeC, typeD},
   ...
}
-- TAG-TCI-STATE-STOP
-- ASN1STOP
```

In Table 5, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

UL BM Process

In UL BM, reciprocity (or beam correspondence) between a Tx beam and an Rx beam may or may not be established depending on UE implementation. When the Tx beam-Rx beam reciprocity is established in both a BS and a UE, a UL beam pair may be obtained based on a DL beam pair. However, when the Tx beam-Rx beam reciprocity is not established in at least one of the BS or the UE, a process of determining a UL beam pair is necessary separately from DL beam pair determination.

Even when both the BS and the UE maintain the beam correspondence, the BS may use the UL BM process for determining a DL Tx beam, even though the UE does not request a report of a (preferred) beam UM BM may be performed by beamformed UL SRS transmission, and whether to apply UL BM to an SRS resource set is configured by (an RRC parameter) usage. When usage is set to 'BeamManagement (BM)', only one SRS resource in each of a plurality of SRS resource sets may be transmitted in a given time instant.

The UE may be configured with one or more sounding reference signal (SRS) resource sets configured by (an RRC layer parameter) SRS-ResourceSet (by RRC signaling). For each SRS resource set, the UE may be configured with K≥1 SRS resources, where K is a natural number and a maximum value of K is indicated by SRS_capability.

The UL BM process may be divided into a UE's Tx beam sweeping and a BS's Rx beam sweeping.

Figure 6:
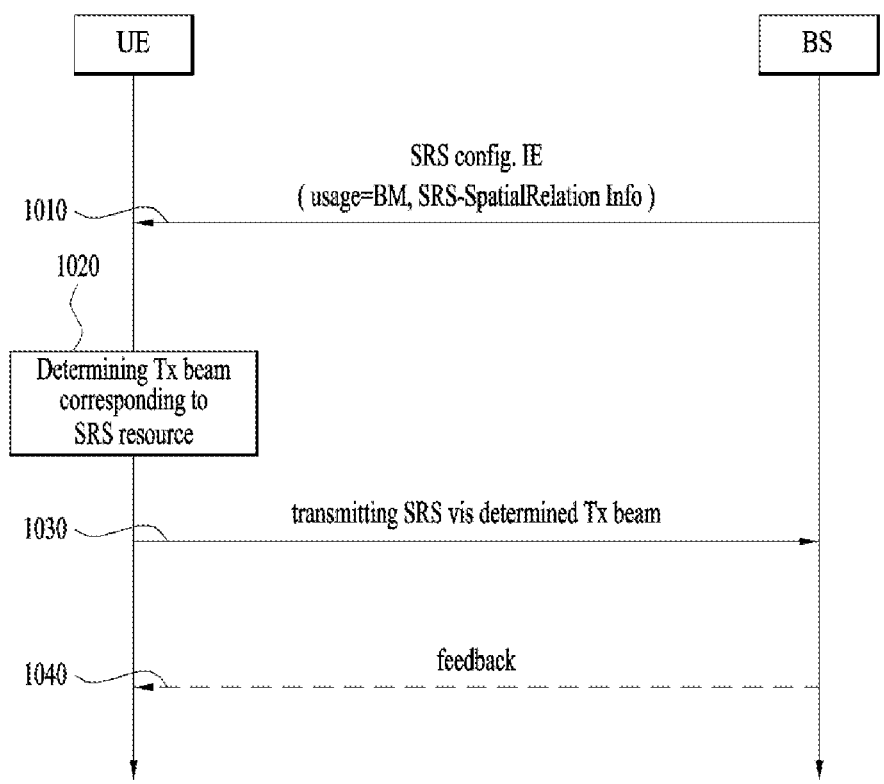
FIG. 6 is a diagram illustrating a signal flow for an exemplary UL BM process using an SRS, to which various embodiments are applicable.

FIG. 6 is a diagram illustrating a signal flow for an exemplary UL BM process using an SRS, which is applicable to various embodiments of the present disclosure.

A UE receives, from a BS, RRC signaling (e.g., SRS-Config IE) including (an RRC parameter) usage set to 'beam management' (1010). The SRS-Config IE is used for an SRS transmission configuration. The SRS-Config IE includes an SRS-Resources list and a SRS-ResourceSet list. Each SRS resource set refers to a set of SRS-resources.

The UE determines Tx beamforming for SRS resources to be transmitted based on SRS-SpatialRelation Info included in the SRS-Config IE (1020). SRS-SpatialRelation Info is configured for each SRS resource and indicates whether to apply the same beamforming as used for an SSB, a CSI-RS, or an SRS on an SRS resource basis.

If SRS-SpatialRelationInfo is configured for an SRS resource, the same beamforming as used for the SSB, the CSI-RS, or the SRS is applied for transmission. However, if SRS-SpatialRelationInfo is not configured for the SRS resource, the UE randomly determines Tx beamforming and transmits the SRS by the determined Tx beamforming (1030).

More specifically, for a P-SRS with 'SRS-ResourceConfigType' set to 'periodic':

i) if SRS-SpatialRelationInfo is set to SSB/PBCH,' the UE transmits the corresponding SRS by applying the same spatial domain transmission filter as the spatial domain Rx filter used for reception of the SSB/PBCH (or a spatial domain transmission filter generated from the corresponding filter); or ii) if SRS-SpatialRelationInfo is set to 'CSI-RS,' the UE transmits the SRS by applying the same spatial domain transmission filter used for reception of the CSI-RS; or iii) if SRS-SpatialRelationInfo is set to 'SRS,' the UE transmits the SRS by applying the same spatial domain transmission filter used for transmission of the SRS.

Additionally, the UE may receive or may not receive a feedback for the SRS from the BS, as in the following three cases (1040).

i) If Spatial_Relation_Info is configured for all SRS resources within an SRS resource set, the UE transmits the SRS with a beam indicated by the BS. For example, if the Spatial_Relation_Info indicates all the same SSB, CRI, or SRI, the UE repeatedly transmits the SRS with the same beam.

ii) Spatial_Relation_Info may be configured for none of the SRS resources within the SRS resource set. In this case, the UE may perform transmission while freely changing SRS beamforming.

iii) Spatial_Relation_Info may be configured for only some SRS resources within the SRS resource set. In this case, the UE may transmit the SRS in the configured SRS resources with the indicated beam, and transmit the SRS in SRS resources for which Spatial_Relation_Info is not configured, by randomly applying Tx beamforming.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 7:
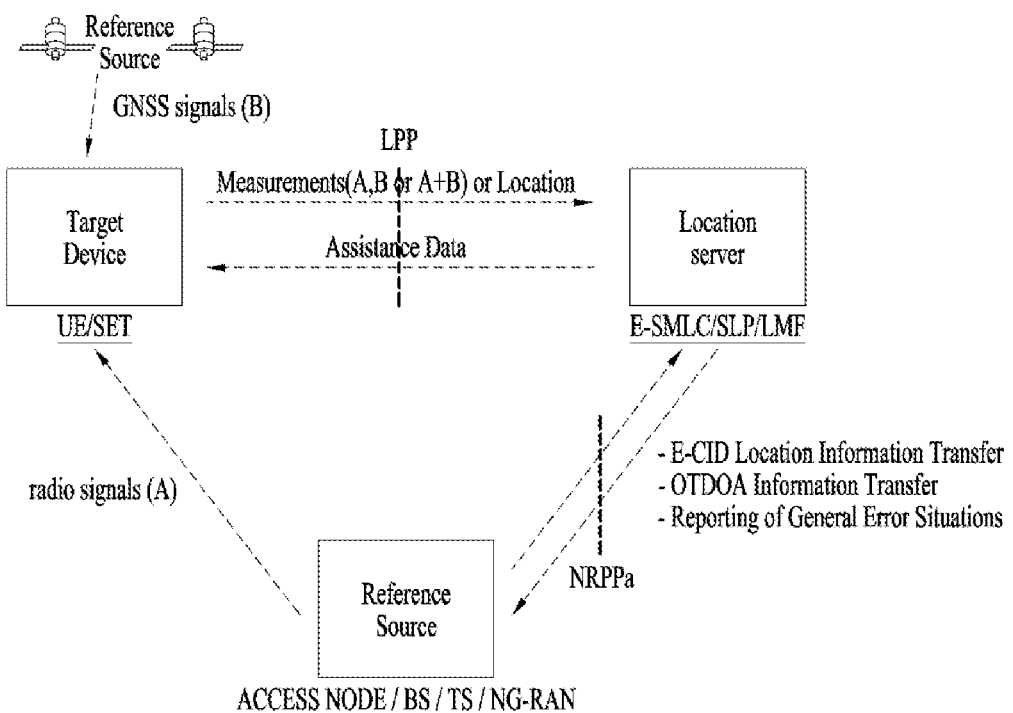
FIG. 7 is a diagram illustrating a positioning protocol configuration for positioning a user equipment (UE), to which various embodiments are applicable.

FIG. 7 is a diagram illustrating an exemplary positioning protocol configuration for positioning a UE, to which various embodiments are applicable.

Referring to FIG. 7, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. Positioning Reference Signal (PRS)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m) = \frac{1}{\sqrt{2}}(1 - 2c(m)) + j\frac{1}{\sqrt{2}}(1 - 2c(m+1)) \quad \text{[Equation 1]}$$

In Equation 1, c(i) may be a pseudo-random sequence. A pseudo-random sequence generator may be initialized by Equation 2.

$$c_{init} = \left(2^{22}\left\lfloor\frac{n_{ID,seq}^{PRS}}{1024}\right\rfloor + 2^{10}(N_{symb}^{slot}n_{s,f}^{\mu} + l + 1)\right. \quad \text{[Equation 2]}$$
$$\left.(2(n_{ID,seq}^{PRS} \bmod 1024) + 1) + (n_{ID,seq}^{PRS} \bmod 1024)\right) \bmod 2^{31}$$

In Equation 2, $n_{s,f}^{\mu}$ may be a slot number in a frame in an SCS configuration $\mu$. A DL PRS sequence ID $n_{ID,seq}^{PRS} \in \{0, 1, \ldots 4095\}$ may be given by a higher-layer parameter (e.g., DL-PRS-SequenceId). l may be an OFDM symbol in a slot to which the sequence is mapped.

Mapping to Physical Resources in DL a PRS Resource

A PRS sequence r(m) may be scaled by $\beta_{PRS}$ and mapped to REs $(k,l)_{p,\mu}$, specifically by Equation 3. $(k,l)_{p,\mu}$ may represent an RE (k, l) for an antenna port p and the SCS configuration $\mu$.

$$a_{k,l}^{(p,\mu)} = \beta_{PRS}r(m)$$

$$m=0,1,\ldots$$

$$k=mK_{comb}^{PRS}+((k_{offset}^{PRS}+k') \bmod K_{comb}^{PRS})$$

$$l=l_{start}^{PRS}, l_{start}^{PRS}+1, \ldots, l_{start}^{PRS}+L_{PRS}-1 \quad \text{[Equation 3]}$$

Herein, the following conditions may have to be satisfied:

The REs $(k,l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$l_{start}^{PRS}$ is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ may be given by a higher-layer parameter DL-PRS-NumSymbols. A comb size $K_{comb}^{PRS} \in \{2,4,6,12\}$ may be given by a higher-layer parameter transmissionComb. A combination $\{L_{PRS}, K_{comb}^{PRS}\}$ of $L_{PRS}$ and $K_{comb}^{PRS}$ may be one of {2, 2}, {4, 2}, {6, 2}, {12, 2}, {4, 4}, {12, 4}, {6, 6}, {12, 6} and/or {12, 12}. An RE offset $k_{offset}^{PRS} \in \{0, 1, \ldots, K_{comb}^{PRS}-1\}$ may be given by combOffset. A frequency offset k' may be a function of $l-l_{start}^{PRS}$ as shown in Table 6.

TABLE 6

| $K_{comb}^{PRS}$ | Symbol number within the downlink PRS resource $1 - 1_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu} n_f + n_{s,f}^{\mu} - T_{offset}^{PRS} - T_{offset,res}^{PRS}\right) \mod 2^{\mu} T_{per}^{PRS} \in \left\{ i T_{gap}^{PRS} \right\}_{i=0}^{T_{rep}^{PRS}-1}$$ [Equation 4]

$N_{slot}^{frame,\mu}$ may be the number of slots per frame in the SCS configuration μ. $n_f$ may be a system frame number (SFN). $n_{s,f}^{\mu}$ may be a slot number in a frame in the SCS configuration μ. A slot offset $T_{offset}^{PRS} \in \{0, 1, \ldots, T_{per}^{PRS}-1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4, 5, 8, 10, 16, 20, 32, 40, 64, 80, 160, 320, 640, 1280, 2560, 5120, 10240\}$ may be given by a higher-layer parameter DL-PRS-Periodicity. A repetition factor $T_{rep}^{PRS} \in \{1,2,4,6,8,16,32\}$ may be given by a higher-layer parameter DL-PRS-ResourceRepetitionFactor. A muting repetition factor $T_{muting}^{PRS}$ may be given by a higher-layer parameter DL-PRS-MutingBitRepetitionFactor. A time gap $T_{gap}^{PRS} \in \{1,2,4,8,16,32\}$ may be given by a higher-layer parameter DL-PRS-ResourceTimeGap.

2.3. UE Positioning Architecture

Figure 8:
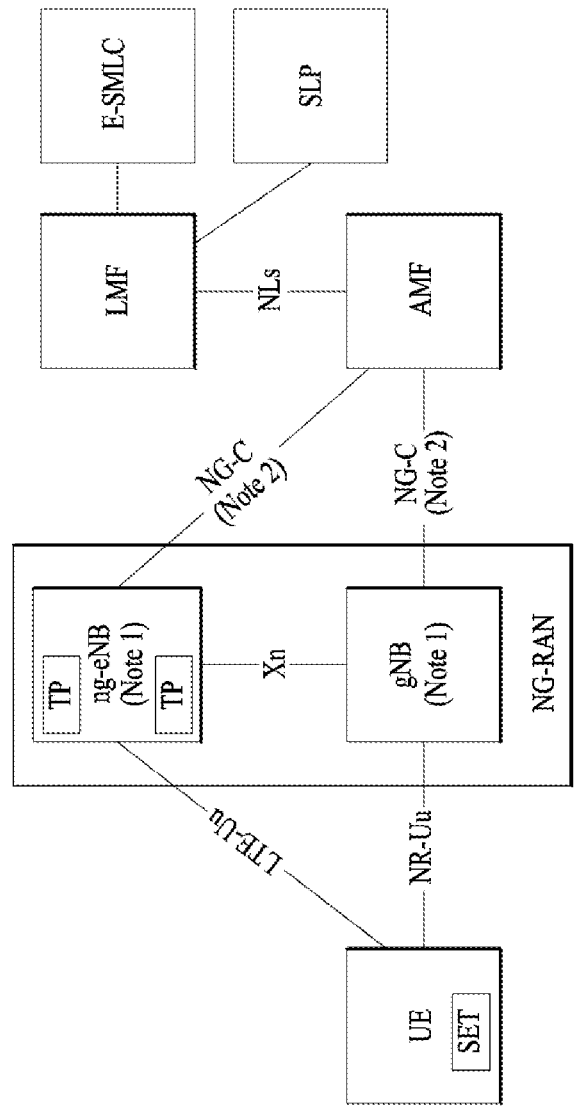
FIG. 8 illustrates architecture of a 5G system applicable to positioning of a UE connected to an NG-RAN or an E-UTRAN.

FIG. 8 illustrates architecture of a 5G system applicable to positioning of a UE connected to an NG-RAN or an E-UTRAN.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 9:
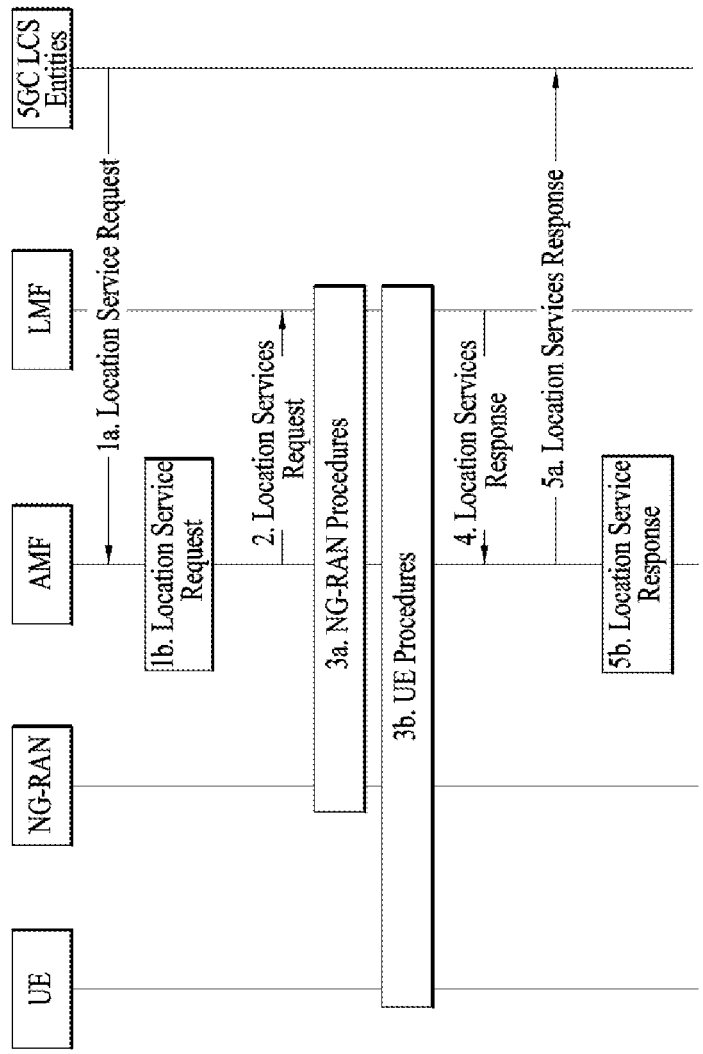
FIG. 9 illustrates an implementation example of a network for UE positioning.

FIG. 9 illustrates an implementation example of a network for UE positioning, which may be used in various embodiments.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Protocol for Positioning Measurement

LTE Positioning Protocol (LPP)

Figure 10:
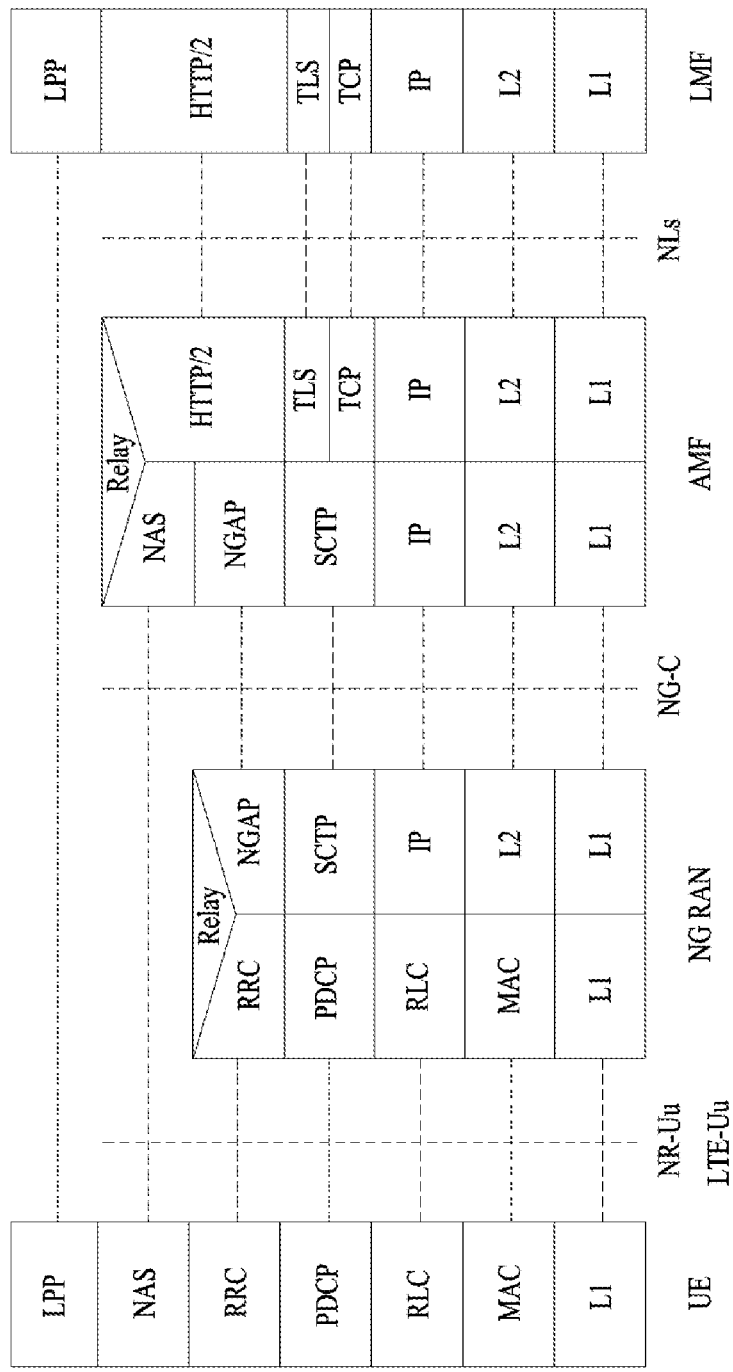
FIG. 10 is a diagram illustrating protocol layers for supporting LTE positioning protocol (LPP) message transmission, to which various embodiments are applicable.

FIG. 10 is a diagram illustrating exemplary protocol layers for supporting LPP message transmission, to which various embodiments are applicable. An LPP PDU may be transmitted in a NAS PDU between an AMF and a UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 11:
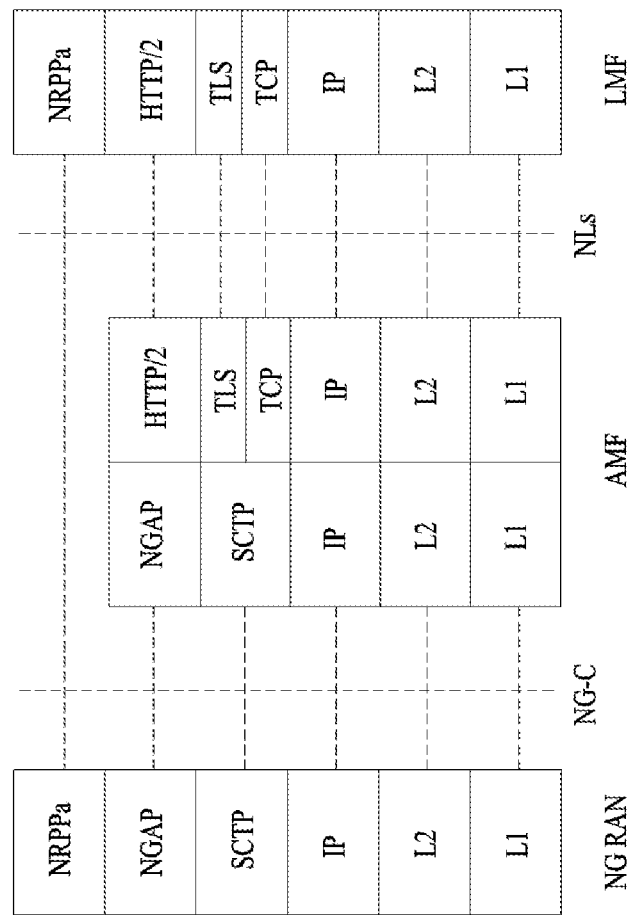
FIG. 11 is a diagram illustrating protocol layers for supporting NR positioning protocol a (NRPPa) protocol data unit (PDU) transmission, to which various embodiments are applicable.

FIG. 11 is a diagram illustrating exemplary protocol layers for supporting NRPPa PDU transmission, to which various embodiments are applicable.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a Global Navigation Satellite System (GNSS), an OTDOA, an enhanced cell ID (E-CID), barometric sensor positioning, WLAN positioning, Bluetooth positioning, a terrestrial beacon system (TB S), uplink time difference of arrival (UTDOA) etc. Although any one of the positioning methods may be used for UE positioning, two or more positioning methods may be used for UE positioning.

OTDOA (Observed Time Difference of Arrival)

Figure 12:
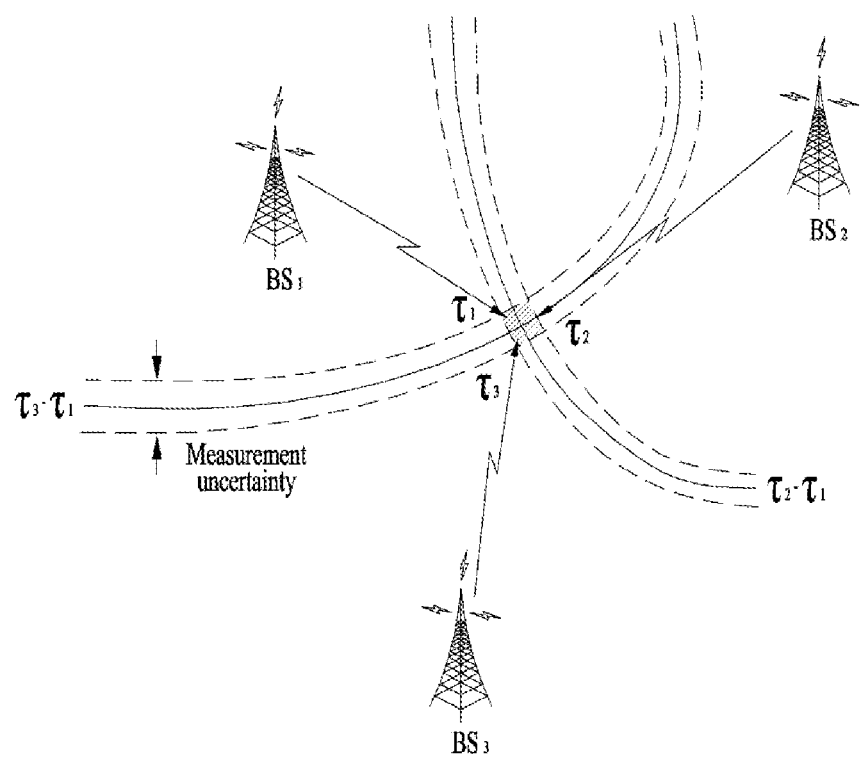
FIG. 12 is a diagram illustrating an observed time difference of arrival (OTDOA) positioning method, to which various embodiments are applicable.

FIG. 12 is a view illustrating an OTDOA positioning method, which may be used in various embodiments.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 5]}$$

where c is the speed of light, {xt, yt} are (unknown) coordinates of a target UE, {xi, yi} are (known) coordinates of a TP, and {x1, y1} are coordinates of a reference TP (or another TP). Here, (Ti–T1) is a transmission time offset between two TPs, referred to as "real time differences" (RTDs), and ni and n1 are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be obtained by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance (TADV), and/or AoA Here, TADV may be divided into Type 1 and Type 2 as follows.

TADV Type 1=(ng-eNB RX-TX time difference)+(UE E-UTRA RX-TX time difference)

TADV Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

FIG. 13 is a diagram illustrating an exemplary multi-round trip time (multi-RTT) positioning method to which various embodiments are applicable.

Referring to FIG. 13(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2−t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1] \quad \text{[Equation 6]}$$

Referring to FIG. 13(b), the RTT may correspond to a double-range measurement between the two devices. Positioning estimation may be performed from the information. Based on the measured RTT, d1, d2 and d3 may be determined, and a target device location may be determined to be the intersection of circles with BS1, BS2, and BS3 (or TRPs) at the centers and radiuses of d1, d2 and d3.

2.7. Sounding Procedure

In a wireless communication system to which various embodiments are applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 7 shows an exemplary SRS request field.

TABLE 7

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperodicSRS-Resource Trigger set to 1 or an entry in aperodicSRS-Resource TriggerList set to 1 SRS resource set(s) configured by SRS-PosResourceSet with an entry in aperodicSRS-Resource TriggerList set to 1 when triggered by DCI formats 0_1, 0_2, 1_1, and 1_2 | SRS resource set(s) configured with higher layer parameter usage in SRS-ResourceSet set to 'antennaSwaching' and resourceType in SRS-ResourceSet set to 'aperiodic' for a $1^{st}$ set of serving cells configured by higher layers |
| 10 | SRS resource set(s) configured by SRS-ResourceSet with higher layer parameter aperodicSRS-Resource Trigger set to 2 or an entry in aperodicSRS-Resource TriggerList set to 2 SRS resource set(s) configured by SRS-PosResourceSet with an entry in aperodicSRS-Resource TriggerList set to 2 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $2^{nd}$ set of serving cells configured by higher layers |
| 11 | SRS resource set(s) configured by SRS-ResourceSet with higher | SRS resource setts) configured with higher layer parameter usage to SRS- |

TABLE 7-continued

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| | layer parameter aperodicSRS-Resource Trigger set to 3 or an entry in aperodicSRS-Resource TriggerList set to 3 SRS resource set(s) configured by SRS-PosResourceSet with an entry in apenodicSRS-Resource TriggerList set to 3 when triggered by DCI formats 0_1, 0_2, 1_1, and 1_2 | Re source Set set to 'antennaSwitching' and resourceType in SRS-ResourceSet set to 'aperiodic' for a $3^{rd}$ set of serving cells configured by higher layers |

In Table 7, srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
AOA (AoA): angle of arrival
CSI-RS: channel state information reference signal
ECID: enhanced cell identifier
LMF: location management function
MAC: medium access control
MAC-CE: MAC-control element
OTDOA (OTDoA): observed time difference of arrival
PRS: positioning reference signal
RS: reference signal
RTT: round trip time
RSRP: reference signal received power
RSRQ: reference signal received quality
RSTD: reference signal time difference/relative signal time difference
SRS: sounding reference signal
SS: synchronization signal
SSB: synchronization signal block
SS/PBCH: synchronization signal/physical broadcast channel
TA: timing advance/time advance
TDOA (TDoA): timing difference of arrival
TOA (ToA): time of arrival
TRP: transmission and reception point (TP: transmission point)
Tx: transmit/transmission, Rx: receive/reception
UTDOA (UTDoA): uplink time difference of arrival In a description of various embodiments, a BS may be understood as a generic term including a remote radio head (RRH), an eNB, a gNB, a TP, a reception point (RP), a relay, etc.

In a description of various embodiments, "greater than A" may be replaced with "equal to or greater than", and "equal to or greater than A" may be replaced with "greater than A".

In a description of various embodiments, "less than B" may be replaced with "equal to or less than B", and "equal to or less than B" may be replaced with "less than B"

In a description of various embodiments, a PRS may be replaced with another DL RS (e.g., an SSB/CSI-RS).

In a description of various embodiments, a UL resource set may include one or more UL resources. For example, information for configuring the UL resource set may include information about an identifier (ID) assigned/allocated/corresponding to the UL resource set, and an ID assigned/allocated/corresponding to each of one or more UL resources included in the UL resource set. For example, information for configuring a UL resource may include an ID assigned/allocated/corresponding to the UL resource. For example, each UL resource/UL resource set may be identified based on each assigned/allocated/corresponding ID.

In a description of various embodiments, a UL PRS may be an SRS for positioning but various embodiments are not limited thereto. For example, the SRS may be replaced with another UL RS (e.g., PRACH).

In a description of various embodiments, a network may be a BS/location server/LMF.

Unless specifically stated otherwise, all operations of a UE mentioned in various embodiments may be configured/indicated/instructed by the network through explicit and/or implicit signaling (e.g., higher layer/lower layer signaling).

Figure 14:
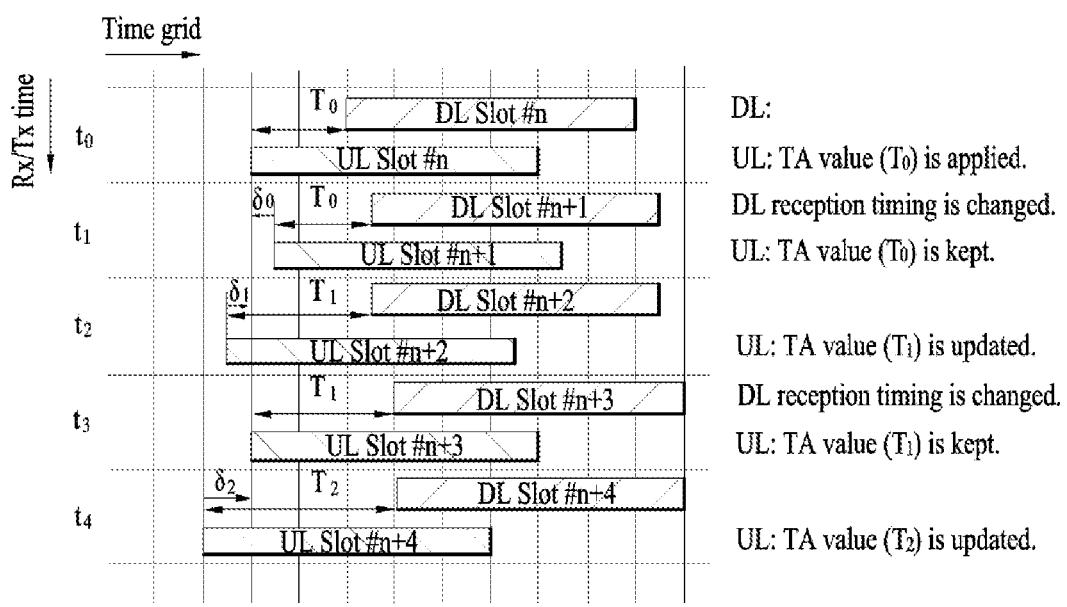
FIG. 14 is a diagram illustrating exemplary change of a DL reception timing and a UL transmission timing, to which various embodiments are applicable.

FIG. 14 is a diagram illustrating exemplary change of a DL reception timing and a UL transmission timing, to which various embodiments are applicable.

Referring to FIG. 14, for example, at time t0, a UE may transmit a UL signal by applying a TA value $T_0$ based on a DL time grid (and/or a DL reception timing).

Next, for example, at time $t_1$, the DL time grid may be slightly changed (e.g., by as much as $\delta_0$) according to reception of a DL signal. For example, if the previously used TA value $T_0$ is applied without change based on the changed DL time grid, then a time difference corresponding to $\delta_0$ with a UL transmission timing transmitted at time t0 may occur.

Next, for example, at time $t_2$, the UL signal may be transmitted according to an updated TA value $T_1$. In this case, for example, if $T_1$ is applied to the DL time grid, there may be a time difference corresponding to $\delta_1$ with the UL transmission timing transmitted at time t0.

Next, for example, at time t3, the UL signal may be transmitted according to the updated TA value $T_1$. In this case, for example, a result of applying $T_1$ as the DL time grid is changed coincides with the UL transmission timing transmitted at time $t_0$, so that a UL PRS may be transmitted at the same timing.

Next, for example, at $t_4$, the UL signal may be transmitted according to an updated TA value $T_2$. In this case, for example, if $T_2$ is applied to the DL time grid, there may be a time difference corresponding to $\delta 2$ with the UL transmission timing transmitted at time $t_0$.

That is, for example, the UL transmission time/timing of the UE may be changed according to change in one or more of a TA value and/or a DL reception timing applied by the UE.

Various embodiments may be related to timing measurement accuracy improvement considering UL transmission time change.

Various embodiments may be related to compensating for/resolving a UE location measurement accuracy error that may occur as a UL signal transmission timing of the UE is changed.

Various embodiments may be related to reporting related information by the UE by considering that the UE is capable of autonomously changing a transmission timing and/or a TA value when the transmission timing and/or the TA value is changed.

Various embodiments may be related to signaling of the UE/network to improve positioning accuracy according to the influence of a UL RS (e.g., UL SRS) transmission timing of the UE in a positioning method (e.g., UTDOA or multi-cell RTT).

Various embodiments may be applied to/used for a positioning method (e.g., UTDOA or multi-cell RTT) in which measurement for a UL RS transmitted by the UE is used.

For example, when the UE transmits a specific RS resource and/or a specific RS resource set (e.g., an SRS resource and/or an SRS resource set) in order to measure the location of the UE, a transmission timing of the UE may be very important.

For example, a plurality of UL RSs may be used for positioning. As an example, an SRS for positioning may be used. For example, although it is not a big problem for the UE to autonomously use a value different from a configured transmission timing/TA value in data communication, this may have a great influence on accuracy in positioning.

For example, if all cells/BSs/TRPs simultaneously receive a UL RS transmitted by the UE at a time and simultaneously calculate/acquire a relative TOA (hereinafter, RTROA/RTOA) at a time, this may cause no particular problem because a relative time difference is calculated/obtained although a transmission timing of the UE and/or a used/applied TA is not accurate.

However, for example, the UE may transmit a plurality of UL RS resources to a specific cell/BS/TRP and/or a plurality of cells/BSs/TRPs at a predetermined time interval. Even if the UE transmits the same UL RS resource, since the UE may transmit the UL RS at a predetermined time interval, a UL transmission timing of the UE may be changed between transmission timings. For example, although the cell/BS/TRP may determine a timing measurement (e.g., ToA) based on one measurement performed/obtained at a specific timing, the cell/BS/TRP may determine a timing measurement for a UL RS resource transmitted by a specific UE by performing filtering (e.g., averaging) after measuring a periodically/semi-persistently transmitted/received UL RS several times.

Figure 17:
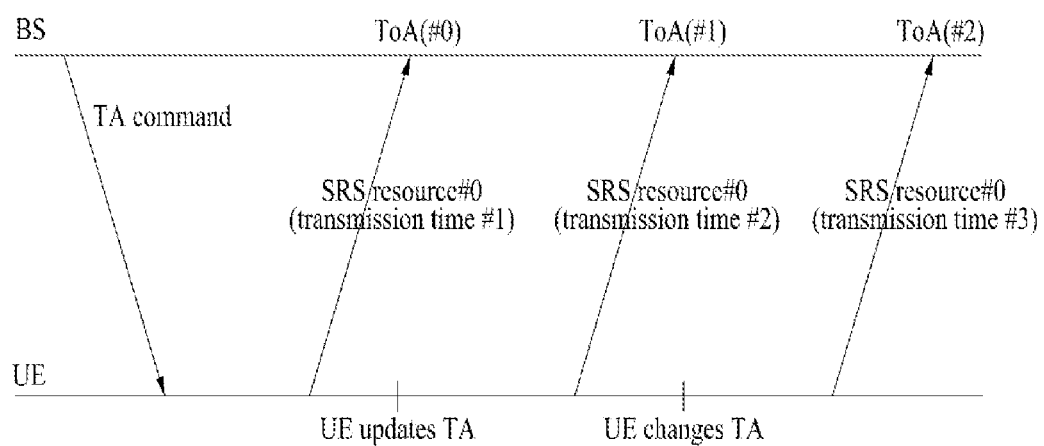
FIG. 17 is a diagram illustrating exemplary timing measurement obtaining to which various embodiments are applicable.

FIG. 17 is a diagram illustrating exemplary timing measurement obtaining to which various embodiments are applicable.

Referring to FIG. 17, for example, a periodically and/or semi-persistently transmitted SRS resource (e.g., SRS for positioning) is received by a specific cell/BS/TRP and then a timing measurement (TOA/RTOA, etc.) may be obtained/performed. For example, SRS resource #0 may be periodically transmitted and received, and TOA measurements TOA(#0), TOA(#1), and TOA(#2) may be performed/obtained in respective reception instances of SRS resource #0.

For example, the UE may periodically transmit a specific SRS resource (e.g., SRS resource #0), and the cell/BS/TRP may acquire/calculate TOA measurement values by receiving SRS resource #0. For example, considering that the cell/BS/TRP finally delivers/transmits/reports one TOA measurement to a location server/LMF, the cell/BS/TRP may determine a single measurement by processing the measured TOA measurement values (e.g., performing filtering, calculating average, or selecting a specific representative value).

For example, although the UE has received a TA command from the cell/BS/TRP before transmission time #1 of SRS resource #0, the UE may transmit an SRS using a TA updated/changed at transmission time #2 of SRS resource #0. Additionally/alternatively, for example, the UE may transmit SRS resource #0 by autonomously adjusting/changing the TA minutely to a predetermined level or less before transmission time #3.

Therefore, for example, the cell/BS/TRP may be unaware of whether or not the UE has used a configured/indicated TA at each transmission timing. For example, the cell/BS/TRP may be unaware of whether or not the UE has used the configured/indicated TA at transmission time #1 (and/or transmission time #2 and/or transmission time #3) and/or it may be difficult for the BS to determine whether the TA for SRS resource #0 transmitted at transmission time #3 has been finely adjusted/changed.

For example, in addition to a propagation time/TOA estimation error for the first arrival path, a propagation time measurement error for a specific SRS resource and/or a specific UE may occur due to failing to identify an accurate transmission timing of the SRS transmitted by the UE. Further, an error may occur when a TOA (e.g., an average or a representative value) is determined through a specific filtering process of several measurement samples. As a result, for example, when a plurality of cells/BSs/TRPs calculates an RTOA based on a timing measurement performed for a specific SRS resource and/or a specific UE, the above-described errors may be reflected.

That is, for example, when UE positioning is performed using a UL-TDOA technique etc., the cell/BS/TRP may measure the RTOA (propagation delay/time) for an SRS resource periodically transmitted by the UE and report the measured RTOA to the location server/LMF. However, for example, transmission timing grids may not be exactly aligned even for the same SRS resource periodically transmitted by the UE due to DL reception timing change and/or TA change indication. For example, the cell/BS/TRP may perform an operation of acquiring multiple timing measurements for a periodically transmitted/received specific SRS resource and filtering the timing measurements (e.g., calculating/acquiring an average or acquiring/selecting a representative value). If a transmission time of the UE is changed, the measurement accuracy of the cell/BS/TRP may be lowered, and thus UE positioning accuracy may be deteriorated. That is, for example, deterioration of timing measurement accuracy at the BS may occur according to change in a positioning SRS resource transmission timing due to autonomous TA change of the UE.

Various embodiments may be related to improving the accuracy of timing measurement (e.g., RTOA) of the BS by considering that a transmission timing of an SRS resource periodically transmitted by the UE may be changed. For example, various embodiments may be related to a method of not changing the transmission timing by the UE using a constant TA window when an SRS resource for UE positioning is transmitted and/or a method of reporting a used TA value to the BS/location server/LMF when the UE uses a TA value different from a TA value indicated at/in a specific period/occasion for transmitting a positioning SRS resource.

Figure 15:
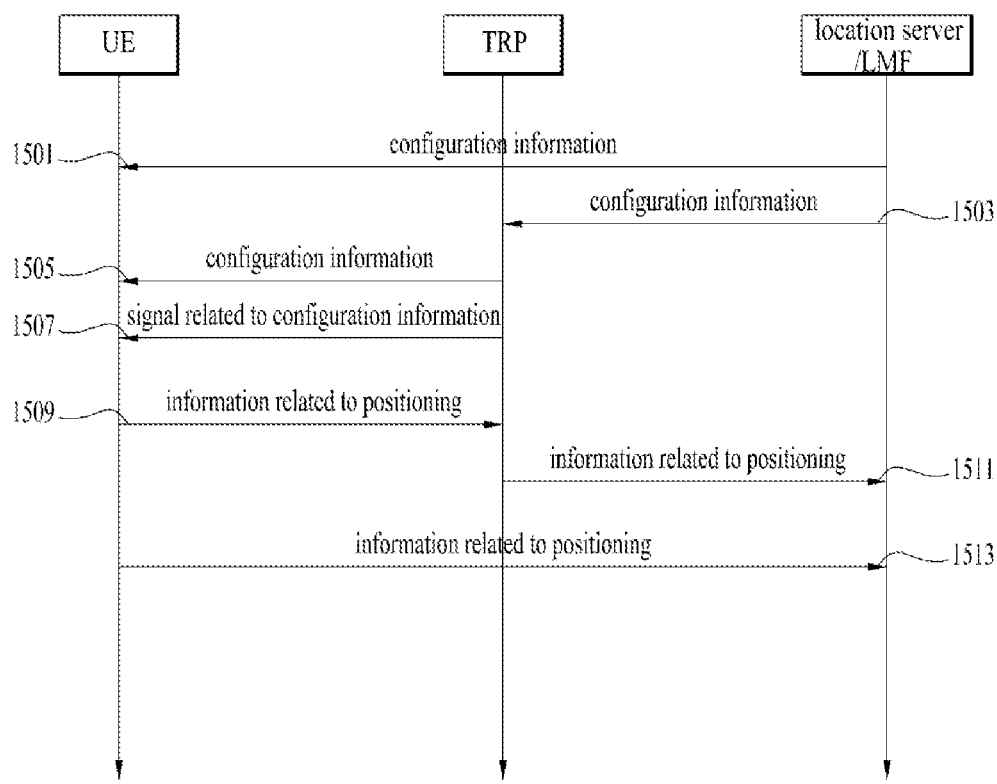
FIG. 15 is a simplified diagram illustrating a method of operating a UE, a transmission and reception point (TRP), a location server, and/or a location management function (LMF) according to various embodiments.

FIG. 15 is a simplified diagram illustrating a method of operating a UE, a TRP, a location server, and/or an LMF according to various embodiments.

Referring to FIG. 15, the location server and/or the LMF may transmit configuration information to the UE, and the UE may receive the configuration information in operation 1501 according to various embodiments.

The location server and/or the LMF may transmit reference configuration information to the TRP, and the TRP may receive the reference configuration information in operation 1503 according to various embodiments. The TRP may transmit the reference configuration information to the UE, and the UE may receive the reference configuration information in operation 1505 according to various embodiments. In this case, operation 1601 according to various embodiments may be skipped.

On the contrary, operations 1503 and 1505 according to various embodiments may be skipped. In this case, operation 1501 according to various embodiments may be performed.

That is, operation 1501 according to various embodiments and operations 1503 and 1505 according to various embodiments may be selectively performed.

In operation 1507 according to various embodiments, the TRP may transmit a signal related to the configuration information to the UE, and the UE may receive the signal related to the configuration information. For example, the signal related to the configuration information may be a signal for positioning the UE.

In operation 1509 according to various embodiments, the UE may transmit a positioning-related signal to the TRP, and the TRP may receive the positioning-related signal. In operation 1511 according to various embodiments, the TRP may transmit the positioning-related signal to the location server and/or the LMF, and the location server and/or the LMF may receive the positioning-related signal.

In operation 1513 according to various embodiments, the UE may transmit the positioning-related signal to the location server and/or the LMF, and the location server and/or the LMF may receive the positioning-related signal. In this case, operations 1509 and 1511 according to various embodiments may be skipped.

On the contrary, operation 1513 may be skipped. In this case, operations 1511 and 1513 according to various embodiments may be performed.

That is, operations 1509 and 1511 according to various embodiments and operation 1513 according to various embodiments may be selectively performed.

According to various embodiments, the positioning-related signal may be obtained based on the configuration information and/or the signal related to the configuration information.

Figure 16:
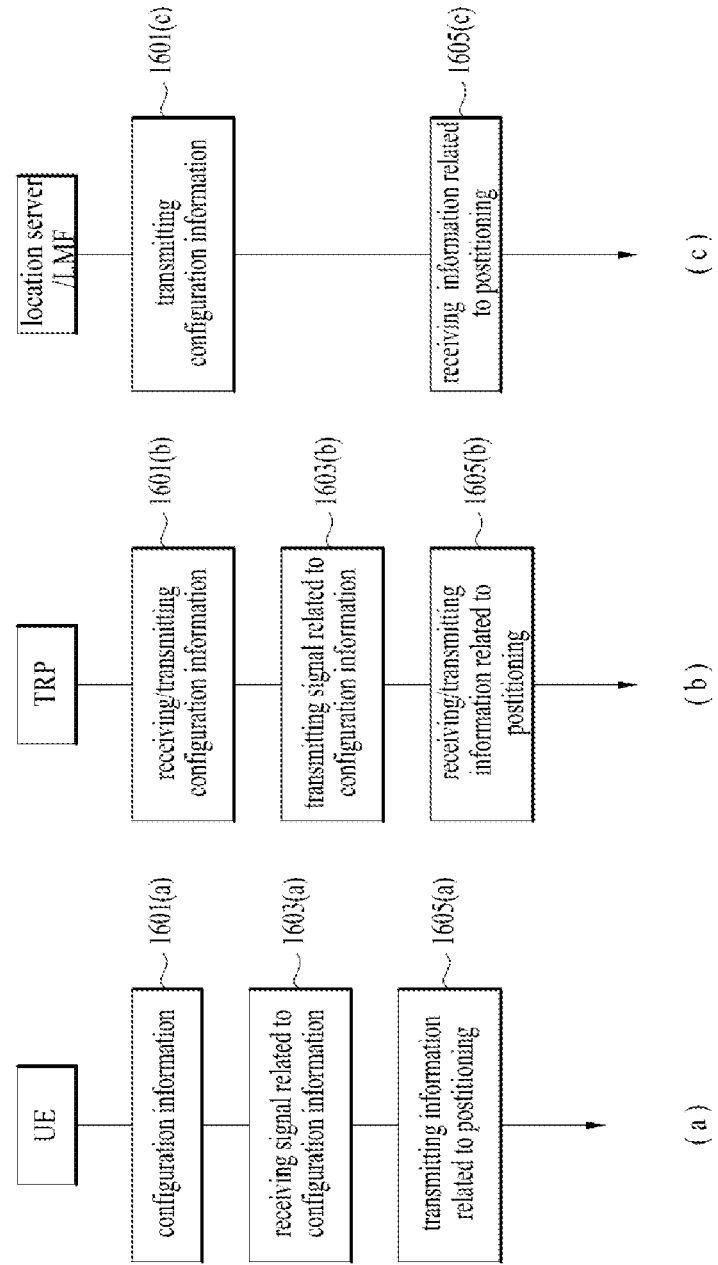
FIG. 16 is a simplified diagram illustrating a method of operating a UE, a TRP, a location server, and/or an LMF according to various embodiments.

FIG. 16 is a simplified diagram illustrating a method of operating a UE, a TRP, a location server, and/or an LMF according to various embodiments.

Referring to FIG. 16(*a*), the UE may receive configuration information in operation 1601(*a*) according to various embodiments.

In operation 1603(*a*) according to various embodiments, the UE may receive a signal related to the configuration information.

In operation 1605(*a*) according to various embodiments, the UE may transmit information related to positioning.

Referring to FIG. 16(*b*), the TRP may receive configuration information from the location server and/or the LMF and transmit the received configuration information to the UE in operation 1601(*b*) according to various embodiments.

In operation 1603(*b*) according to various embodiments, the TRP may transmit a signal related to the configuration information.

In operation 1605(*b*) according to various embodiments, the TRP may receive information related to positioning and transmit the received information related to positioning to the location server and/or the LMF.

Referring to FIG. 16(*c*), the location server and/or the LMF may transmit configuration information in operation 1601(*c*) according to various embodiments.

In operation 1605(*c*) according to various embodiments, the location server and/or the LMF may receive information related to positioning.

For example, the configuration information may be understood as being related to reference configuration (information) and/or one or more pieces of information that the location server and/or the LMF and/or the TRP transmits to/configures for the UE, and/or as being the reference configuration (information) and/or the one or more pieces of information that the location server and/or the LMF and/or the TRP transmits to/configures for the UE, in the following description of various embodiments.

For example, the signal related to positioning may be understood as a signal related to at least one piece of information reported by the UE and/or as a signal including the at least one piece of information reported by the UE, in the following description of various embodiments.

For example, BS, gNB, or cell may be replaced with TRP, TP, or any device playing the same role, in the following description of various embodiments.

For example, location server may be replaced with server, LMF, or any device playing the same role, in the following description of various embodiments.

More specific operations, functions, terms, and so on in operations according to various embodiments may be performed and described based on various embodiments described later. The operations according to various embodiments are exemplary, and one or more of the above-described operations may be omitted according to specific details of each embodiment.

A detailed description will be given below of various embodiments. Unless contradicting each other, the various embodiments described below may be combined fully or partially to form other various embodiments, which may be clearly understood by those skilled in the art.

Proposal #1

According to various embodiments, given that a UL transmission timing of the UE is not a continuously fixed specific value, the UE may report information about a transmission timing at which the UE has actually transmitted a UL RS (e.g., SRS for positioning) at various levels and/or information about an actually used TA to the B S/location server/LMF.

According to various embodiments, the UE may transmit the UL RS (e.g., SRS for positioning) using a TA different from a configured/indicated TA and/or transmit the UL RS (e.g., SRS for positioning) while continuously changing/updating the transmission timing. According to various embodiments, the UE may report information about the TA used for UL RS transmission and/or information about the transmission timing to the B S/location server/LMF.

According to various embodiments, "the information about the actually used TA" (and/or "the information about the TA used for UL RS transmission") may be information of a level capable of indicating/recognizing the fact that the UE has not used the same value as the configured/indicated TA, information about a TA value that the UE has actually used (and/or a TA value used for UL RS transmission), and/or information about the difference between a qualitatively used TA value (and/or the TA value used for RS transmission) and the configured/indicated TA value.

According to various embodiments, the operation of the UE may be configured/indicated by the B S/location server/LMF.

Additionally/alternatively, according to various embodiments, the UE may transmit/report information about a DL reception time used thereby to the BS/location server/LMF.

According to various embodiments, "the information about the actually used TA" (and/or "the information about the TA used for UL RS transmission") may include one or more of the following information:
  information about a TA and/or a transmission timing used by the UE for each UL RS resource, each UL RS resource set, each (specific) UL RS resource, and/or each (specific) UL RS resource set
  a specific period of each UL RS resource and/or a transmission time instance of each (specific) UL RS resource
  a specific time window/time duration. An example of the specific time window and time duration according to various embodiments may refer to a description of various embodiments to be described later (e.g., Proposal #1-2, Proposal #1-2-2, and Proposal #1-2-2).

Various embodiments may be applied to various positioning methods. For example, various embodiments may be used for a UTDOA/multi-cell RTT method but are not limited thereto. According to various embodiments, the above-described content/embodiment may be configured for/indicated to the UE by the BS/location server/LMF in conjunction with a positioning technique (e.g., UTDOA/multi-cell RTT method). The operation of the UE according to various embodiments may be configured/indicated by the BS/location server/LMF.

Figure 18:
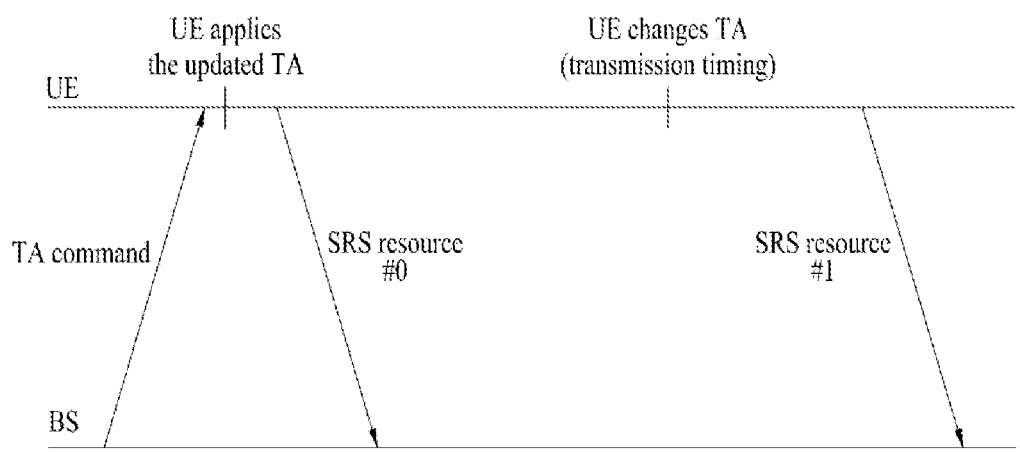
FIG. 18 is a diagram illustrating exemplary SRS resource transmission using different transmission timings, to which various embodiments are applicable.

FIG. 18 is a diagram illustrating exemplary SRS resource transmission using different transmission timings, to which various embodiments are applicable.

Referring to FIG. 18, for example, when a plurality of SRS resources is transmitted and received over a plurality of slots and/or symbols, the UE may transmit a specific SRS resource and update a TA by reflecting a TA command indicated/configured by the cell/TRP/BS before transmitting the next SRS resource. Additionally/alternatively, for example, as a DL reception timing of the UE is changed, the UE may autonomously change a UL transmission timing.

That is, for example, when a specific TRP #1 (and/or cell #1/BS #1) receives SRS resource #0 to calculate/acquire a TOA, and a specific TRP #2 (and/or cell #2/BS) #2) receives SRS resource #1 to calculate/acquire a TOA, an error may occur in a resultant RTOA value obtained through the two TOAs.

Therefore, according to the above-described various embodiments, it may be necessary to report/transmit a TA value that the UE has actually used for each UL RS resource and/or each UL RS resource set and/or transmission timing information. According to various embodiments, the reported/transmitted information may be utilized to improve timing measurement (e.g., RTOA) accuracy of the BS.

Proposal #1-1

According to various embodiments, while transmitting a specific periodic and/or semi-static UL RS (e.g., SRS for positioning) resource and/or UL RS resource set, the UE may transmit/report TA information and/or transmission timing information used/applied at/to each transmission timing and/or a partial transmission timing to the BS/location server/LMF.

According to various embodiments, even if the UE does not receive a TA command from the network, the UE may partially change a TA and a transmission timing within a range satisfying a requirement while transmitting a UL RS resource and/or a UL RS resource set from a specific transmission timing/period and transmit/report information about an actually used TA/transmission timing (effective/actual TA or a TA used for UL RS transmission) to the BS/location server/LMF.

For example, the above-mentioned requirement may be predefined/configured, and the UE may adjust a TA value within a condition/range in which the corresponding requirement is satisfied. For example, the requirement may be a UE initial transmission timing error equal to or less than ±Te. For example, Te may be defined as shown in Table 8 as a timing error limit. In Table 8, Tc may mean a basic time unit.

TABLE 8

| Frequency Range | SCS of SSB signals (kHz) | SCS of uplink signals (kHz) | $T_e$ |
|---|---|---|---|
| 1 | 15 | 15 | $12*64*T_c$ |
|   |   | 30 | $10*64*T_c$ |
|   |   | 60 | $10*64*T_c$ |
|   | 30 | 15 | $8*64*T_c$ |
|   |   | 30 | $8*64*T_c$ |
|   |   | 60 | $7*64*T_c$ |
| 2 | 120 | 60 | $3.5*64*T_c$ |
|   |   | 120 | $3.5*64*T_c$ |
|   | 240 | 60 | $3*64*T_c$ |
|   |   | 120 | $3*64*T_c$ |

For example, the above-mentioned requirement may be applied to first transmission (e.g., PUCCH, PUSCH, or SRS), PRACH transmission, and/or Msg A transmission, within a discontinuous reception (DRX) cycle.

In relation to TA adjustment described above, for example, the UE may transmit a UL RS resource and/or a UL RS resource set by adjusting a TA value within a timing error (e.g., $T_e$ described above) that should at least be satisfied for initial transmission of as SRS (and/or UL RS). As another example, for non-initial transmission, the UE may transmit the UL RS resource and/or the UL RS resource set by directly changing a transmission timing within a maximum value satisfying a maximum and/or minimum supportable TA change amount within a specific period and/or allowing application of a single TA, and/or within a maximum TA value capable of being configured/designated/indicated by a TA command.

Additionally/alternatively, according to various embodiments, the UE may transmit/report information about a DL reception time measured/used thereby to the BS/location server/LMF.

According to various embodiments, Case 1 and Case 2 below may be considered.

Case 1

According to various embodiments, when the UE transmits the SRS using the TA value indicated/configured by the network without change, one or more of the following operations of the UE may be considered:

Option #1: For example, the UE may report nothing to the B S/location server/LMF. For example, the UE may not report information related to a TA and/or a transmission timing to the B S/location server/LMF. For example, such an operation of the UE may be defined and/or indicated/configured as a default behavior.

Option #2: For example, the UE may report the fact that the UE has used a configured/indicated TA value without change to the B S/location server/LMF. For example, a 1-bit signal indicating this may be introduced. For example, the 1-bit signal being a first value (0 or 1) may be mapped to the case in which the configured/indicated TA value has been used without change (and/or has been used with change), and the 1-bit signal being a second value (1 or 0) may be mapped to the case in which the configured/indicated TA value has been used with change (and/or has been used without change). As another example, the 1-bit signal may be transmitted/received always as a value mapped to the case in which the configured/indicated TA value has been used without change (and/or has always been used with change), and other operations according to various embodiments may be performed when the configured/indicated TA value has been used with change (and/or has been used without change).

The size of bits is exemplary and various embodiments are not limited thereto. According to various embodiments, bits related to using the configured/indicated TA value without change may have various values in addition to one bit. For example, bits having a first value may correspond/be mapped to the case in which the configured/indicated TA value has been used without change (and/or has been used with change), and the bits having a second value may correspond/be mapped to the case in which the configured/indicated TA value has been used with change (and/or has been used without change). For example, the bits having a value other than the first value and the second value may correspond/be mapped to the case in which the bits have been reserved and/or may be used to transmit other information to the network. As another example, the bits may be transmitted/received always as a value mapped to the case in which the configured/indicated TA value has been used without change (and/or has been used with change), and other operations according to various embodiments may be performed when the configured/indicated TA value has been used with change (and/or has been used without change).

Option #3: For example, the UE may report information about the configured/indicated TA value and/or a measured/used DL reception time t0 the BS/location server/LMF.

Option #4: For example, the UE may report information about only the DL reception time used/measured thereby to the BS/location server/LMF. For example, the UE may inform the BS/location server/LMF that the DL reception time has not been changed. For example, even when the same TA value is used, if the reception time is changed, an actual transmission timing may be changed because the TA value means a difference value based on the DL reception time.

Case 2

According to various embodiments, when the UE transmits an SRS using a value different from a TA value indicated/configured by the network, one or more of the following operations of the UE may be considered:

Option #1: For example, the UE may report an actually used/applied effective/actual TA (TA used for UL RS transmission) value itself and/or information about a measured/used DL reception time t0 the BS/location server/LMF.

Option #2: For example, the UE may report only a difference value between the configured/indicated TA value and an actually used/applied TA (TA used for UL RS transmission) value to the BS/location server/LMF. (For example, the UE may report a difference value between the configured/indicated TA value and an effective/actual TA value, rather than the effective/actual TA value itself.) Additionally/alternatively, for example, the UE may report the information about the measured/used DL reception time t0 the B S/location server/LMF.

For example, when TA_effective is the actually applied TA value and TA_indicated is the indicated/configured TA value, this may be expressed as follows:
TA_effective=TA_indicated+TA_Delta For example, TA_Delta may be the difference between TA_effective and TA_indicated, and the UE may report only the TA_Delta value to the BS/location server/LMF.

In Option #2 of Case 2 according to various embodiments, since the difference value between the TA value configured/indicated by the UE and the TA value actually used by the UE is reported, signaling overhead is relatively small so that Option #2 of Case 2 may be advantageous relative to Option #1 of Case #2 in terms of signaling overhead. Conversely, Option #1 of Case #2 according to various embodiments may be more advantageous than Option #2 of Case #2 in terms of accuracy. For example, when a TA value previously configured/indicated by the UE is different from a TA value configured/indicated by the BS, if the UE reports only the difference value (delta value), there may be the case in which the BS/location server/LMF is accurately unaware of a TA value actually applied by the UE. In this case, although signaling overhead may be relatively large, Option #1 of Case #2 may be more advantageous in terms of accuracy of transmitting information about the TA value used/applied by the UE.

For example, since mutually advantageous aspects are different from each other, an operation method of the UE/network may be selected in consideration of these aspects. For example, an operation based on Option #1 may be performed when an accuracy aspect is more important than a signaling overhead aspect according to the case in which the amount of radio resources is relatively large and/or when the TA value previously configured/indicated by the UE is different from the TA value configured/indicated by the BS. As a converse example, an operation based on Option #2 may be performed when the signaling overhead aspect is more important than the accuracy aspect according to the case in which the amount of radio resources is relatively small and when the TA value previously configured/indicated by the UE is equal to the TA value configured/indicated by the BS.

According to various embodiments, in addition to Option #2 described above, a procedure/operation of confirming whether a TA value configured/indicated by the cell/BS/TRP is equal to a TA value used by the UE may be additionally and/or separately performed by introducing features described in proposals below.

Proposal #1-1-1 (Effective TA Difference Reporting)

According to various embodiments, the UE may report, to the BS/location server/LMF, information about one or more TA values, transmission timing values, and/or DL reception times, used for a periodically and/or semi-persistently transmitted specific UL RS resource and/or UL RS resource set. For example, one or more of the following options may be considered:

Option #1: For example, the UE may report only a TA_Delta value, which is a difference value with the configured/indicated TA value. Additionally/alternatively, for example, the UE may report information about a DL reception time used by the UE in addition to and/or separately from the above information.

Option #2: For example, the UE may report only a difference value with an (effective/actual) TA value reported at a previous timing. Additionally/alternatively, for example, the UE may report the information about the DL reception time used by the UE in addition to and/or separately from the above information.

As an example of Option #2, assuming that TA* has been configured/indicated for the UE by the network, and TA(1), TA(2), and TA(3) are TAs actually used by the UE, transmission times may be indicated as follows. For example, transmission times #1, #2, and #3 may mean timings at which the UE transmits a specific UL RS.

transmission time #1: TA(1)
transmission time #2: TA(2)=TA(1)+delta(1)
transmission time #3: TA(3)=TA(2)+delta(2)

For example, the UE may report TA(1) as information about transmission time #1. For example, TA(1) may be different from TA*. For example, the UE may report delta(1) as information about transmission time #2. For example, the UE may report delta(2) as information about transmission time #3.

Option #3: For example, the UE may report a difference value as compared with a delta value reported at a previous time. Additionally/alternatively, for example, the UE may report the information about the DL reception time used by the UE in addition to and/or separately from the above information.

As an example of Option #3, assuming that TAs substantially used by the UE at transmission times #1, #2, and #3 at which the UE transmits a specific UL RS resource are TA(1), TA(2), and TA(3), the transmission times may be indicated as follows.

transmission time #1: TA(1)
transmission time #2: TA(2)=TA(1)+delta(1)
transmission time #3: TA(3)=TA(1)+delta(1)+delta(2)

For example, the UE may report TA(1) as information about first transmission time #1. For example, the UE may report delta(1) as information about second transmission time #2. For example, the UE may report delta(2) as information about third transmission time #3.

Proposal #1-2 (Constant UL Time Window)

According to various embodiments, the UE may report the fact that the UE has transmitted a UL RS resource and/or a UL RS resource set using a fixed TA and/or a fixed transmission timing during a specific time (hereinafter, a constant UL time window/duration) to the BS/location server/LMF. That is, according to various embodiments, even if a DL reception timing of the UE is changed, a UL transmission timing of the UE (e.g., a time grid and/or an orthogonal frequency division multiplexing (OFDM) symbol grid) may not be changed.

According to various embodiments, the constant UL time window may be determined (autonomously) by the UE and/or configured/indicated by the BS/location server/LMF. For example, the BS/location server/LMF may configure/indicate, for/to the UE, an SRS resource and/or an SRS resource set for positioning, and the UE may indicate/configure a specific time duration (constant UL time window) in which a transmission timing and/or a TA is not changed for a part or all of the SRS resource and/or the SRS resource set.

According to various embodiments, the constant UL time window may be determined/configured/indicated with respect to a specific UL RS resource, a specific group of UL RS resources (e.g., the group of UL RS resources may be a group of UL resources including one or more UL resources), and/or a specific UL RS resource set.

According to various embodiments, one or more of Case 1 and Case 2 may be considered:

Case 1

According to various embodiments, the UE may receive configuration/indication of the constant UL time window for positioning from the BS/location server/LMF.

According to various embodiments, the UE may fixedly use a specific TA and/or transmission timing value upon transmitting a UL resource and/or a UL resource set configured/indicated for UE positioning in a time window.

For example, within the time window, the UE may maintain the specific TA and/or transmission timing for all UL transmissions.

As a converse example, maintaining the fixed TA within the time window may be applied only to a UL resource and/or a UL resource set for positioning. In this case, for example, the UE may disregard a TA command configured/indicated by the network with respect to UL transmission for positioning.

Case 2

According to various embodiments, the UE may (autonomously) determine a constant UL time window. In this case, according to various embodiments, the UE may report the constant UL time window to the BS/location server/LMF. For example, when the constant UL time window is determined for each specific UL RS resource and/or UL RS resource set, information related thereto (e.g., information about the specific UL RS resource and/or UL RS resource set) may also be provided by the UE.

Additionally/alternatively, according to various embodiments, the UE may inform the BS/location server/LMF whether a specific TA has been maintained (regardless of a TA command) only for UL RS resource and/or UL RS resource set transmission for positioning within a time window.

Additionally/alternatively, according to various embodiments, the UE may inform the BS/location server/LMF whether a specific TA has been maintained (regardless of the TA command) for all UL RS transmissions including UL RS resource and/or UL RS resource set transmission for positioning within a time window.

For example, as an example of configuration of the time window, a timer indicating that the time window is valid for a specific time may be configured. For example, while the timer is running, a specific TA may be applied to any UL RS transmission and/or UL RS transmission for positioning (regardless of the TA command).

In Proposal #1-2 according to various embodiments, it may be important that the UE does not change a UL transmission time grid. For example, when a DL reception timing/time of the UE is changed, a UL transmission timing may be changed even if the same TA value is used based on the DL reception timing/time. It is intended in Proposal #1-2 according to various embodiments that the UL transmission time grid be maintained even if the DL reception timing/time is changed. That is, according to various embodiments, even when a TA command is configured for/indicated to the UE by the BS/location server/LMF, an operation of the UE maintaining the same TA value when a UL SRS is transmitted for positioning may mean that the same TA value is used while an existing DL reception timing is equally maintained without change.

According to various embodiments, using the same TA by the UE within the UL time window may mean maintaining the same UL transmission timing by calculating/acquiring a TA based on the same DL reception time. That is, according to various embodiments, the UE may use the existing DL reception timing as a DL reception time for TA calculation/obtaining even when the DL reception time of the UE is changed within a constant UL window (and/or a specific time threshold (e.g., before X (>0) symbols and/or Y (>0) slots)). All operations of the UE proposed in Proposal #1-2 according to various embodiments may be configured/indicated by the BS/location server/LMF.

Proposal #1-2-1 (Activation Starting Time)

According to various embodiments, when a constant UL time window is configured/indicated, the BS/location server/LMF may indicate/configure a timing at which the time window is activated and/or becomes valid.

For example, the BS/location server/LMF may indicate/configure, to/for the UE, activation of the constant UL time window from X (>0) symbols and/or Y (>0) slots after the time window is configured for/indicated to the UE.

For example, the time window may be indicated/configured through RRC/MAC-CE/DCI and indicated to/configured for the UE so that a time window duration is changed/readjusted.

Proposal #1-2-2 (DL Signal Processing)

According to various embodiments, in a frequency division duplex (FDD) system, the UE may receive a DL signal in the configured time window. For example, when a DL reception timing is changed, the UE may apply/use the changed timing upon receiving the DL signal and disregard the changed DL timing only upon calculating/acquiring a UL TA.

For example, the following various embodiments may be considered so that signaling overhead, etc. is reduced as an effective/actual TA value used by the UE is reported.

Proposal #1-3

According to various embodiments, the UE may report/transmit only change or non-change of a transmission timing and/or a TA to the BS/location server/LMF while transmitting a specific UL RS resource and/or a specific UL RS resource set (for a specific time and/or continuously).

For example, a 1-bit field may be introduced and reported as binary information. For example, the 1-bit field being a first value (0 or 1) may be mapped to the case in which a transmission timing and/or a TA value has not been changed (and/or has been changed), and the 1-bit field being a second value (1 or 0) may be mapped to the case in which the transmission timing and/or the TA value has been changed (and/or has not been changed). As another example, the 1-bit field may be transmitted/received always as a value mapped to the case in which the transmission timing and/or the TA value has not been used changed (and/or has been changed), and other operations according to various embodiments may be performed when the transmission timing and/or the TA value has been changed (and/or has not been changed).

The size of the bit field is exemplary, and various embodiments are not limited thereto. According to various embodiments, the bit field related to change or non-change of the transmission timing and/or the TA may have various values in addition to 1 bit. For example, the bit field being a first value may correspond/be mapped to the case in which the transmission timing and/or the TA value has not been changed (and/or has been changed), and the bit field being a second value may correspond/be mapped to the case in which the transmission timing and/or the TA value has been changed (and/or has not been changed). For example, the bit field having a value other than the first value and the second value may correspond/be mapped to the case in which the bit field has been reserved and/or may be used to transmit other information to the network. As another example, the bit field may be transmitted/received always as a value mapped to the case in which the transmission timing and/or the TA value has been changed (and/or has not been changed), and other operations according to various embodiments may be performed when transmission timing and/or the TA value has been changed (and/or has not been changed).

For example, the UE may report/transmit the fact that the TA value has been updated (at a specific timing) to the configured/indicated TA value to the BS/location server/LMF.

According to various embodiments, the BS/location server/LMF may check whether the TA of the UE has been changed.

For example, this may be helpful for the BS/location server/LMF to identify whether the UE has failed to detect or has succeeded in detecting information (about indication/configuration of update of the TA value) when the BS/location server/LMF indicates/configures update of the TA value to/for the UE.

For example, if the UE reports non-change of the TA to the BS/location server/LMF, the network (BS/location server/LMF) may identify that the UE has missed a TA command although the network has transmitted the TA command while receiving a specific SRS resource and/or a specific SRS resource set. Therefore, the network may calculate/acquire timing measurement by excluding update of the TA.

For example, the following various embodiments may be considered so that the consistency or match between a TA value indicated/configured by the network and a TA value used by the UE may be confirmed.

Proposal #2-0 (Current TA Check)

According to various embodiments, the UE may be requested by the BS/location server/LMF to confirm whether a specific TA value is a TA value currently used/applied (by the UE) and may report information thereabout.

For example, True/False may be known through a binary signal. For example, a 1-bit field may be introduced and reported as binary information. For example, the 1-bit field being a first value (0 or 1) may be mapped to True indicating that the specific TA value is equal to the currently used TA value, and the 1-bit field being a second value (1 or 0) may be mapped to False indicating that the specific TA value is different from the currently used TA value.

The size of the bit field is exemplary, and various embodiments are not limited thereto. According to various embodiments, the bit field related to change or non-change of the transmission timing and/or the TA may have various values in addition to one bit. For example, the bit field being a first value may correspond/be mapped to True indicating that the specific TA value is equal to the currently used TA value, and the bit field being a second value may correspond/be mapped to False indicating that the specific TA value is different from the currently used TA. For example, the bit field having a value other than the first value and the second value may be used to correspond/be mapped to the case in which the bit field has been reserved and/or may be used to transmit other information to the network.

According to various embodiments, the UE may report the currently used/applied UL transmission timing value and/or TA value to the BS/location server/LMF. The operation of the UE according to various embodiments may be indicated/requested/configured by the BS/location server/LMF. For example, the BS/location server/LMF may transmit a specific TA value to the UE and indicate/request/configure report of True to/for/for the UE when the specific TA value is equal to the currently used TA value.

For example, when the specific TA value is equal to the currently used TA value (True), information only about True may be reported, and information about an effective/actual TA may not be reported. As a converse example, when the specific TA value is different from the currently used TA value (False), information about False and/or information about the effective/actual TA may be reported. For example, a more specific embodiment in which the information about the effective/actual TA is reported may follow one or more of various related embodiments.

According to various embodiments, the BS/location server/LMF may request that the UE report a used/applied TA value in order to confirm the TA value used/applied by the UE for a specific UL RS resource and/or a specific UL RS resource set (e.g., UL RS for positioning).

According to various embodiments, the BS/location server/LMF may request that the UE report a specific timing and/or a used/applied TA value in order to confirm the TA value used/applied by the UE for a specific timing at which the specific UL RS resource and/or the specific UL RS resource set (e.g., UL RS for positioning) has been transmitted.

For example, as described above, the UE may report only a delta value based on the specific TA value. However, for example, when the UE misses a TA command of the BS, if the UE reports only the delta value, the BS/location server/LMF is continuously provided with incorrect information, so that the BS/location server/LMF may fail to perform/acquire accurate timing measurement. According to various embodiments, this problem may be solved.

According to various embodiments, the UE may additionally report information about a changed TA value to the BS/location server/LMF in consideration of a factor by which an effective TA value actually used/applied by the UE is changed. The following various embodiments may be considered.

Proposal #2-0

According to various embodiments, the UE may report information about a DL reception timing used/applied/obtained by the UE at a timing at which a specific UL RS resource and/or a specific UL RS resource set (e.g., SRS) is transmitted and/or information about change of the DL reception timing (based on a specific timing) to the BS/location server/LMF.

According to various embodiments, the UE may consider/use a timing at which a changed TA is applied and/or a timing at which a TA is updated, based on a timing at which change of a DL reception timing is calculated/measured/recognized.

As a more specific example according to various embodiments, one or more of the following methods may be considered. The operation of the UE according to various embodiments may be configured/indicated by the BS/location server/LMF:

For example, a 1-bit signal (0 or 1) may be introduced. For example, the UE may report only change or non-change of a DL reception timing to the BS/location server/LMF. For example, the 1-bit signal being a first value (0 or 1) may be mapped to the case in which there is non-change (and/or change) in the DL reception timing, and the 1-bit signal being a second value (1 or 0) may be mapped to the case in which there is change (and/or non-change) in the DL reception timing. As another example, 1 bit may be transmitted/received always as a value mapped to the case in which the DL reception timing has been unchanged (and/or changed), and other operations according to various embodiments may be performed when the DL reception timing has been changed (and/or unchanged).

For example, when the DL reception timing has been changed, this may mean that a DL reception timing used to determine a UL transmission timing of a current UL RS has been changed as compared with an existing DL reception timing obtained/calculated/detected by the UE. In a description of various embodiments, the existing DL reception timing may be a signal obtained/calculated/detected from a predetermined DL signal received from the network and/or may be a DL reception signal used to determine the UL transmission timing in transmitting a predetermined UL signal at a timing before the UE transmits a current UL RS. For example, when a UL RS is periodically and/or semi-persistently configured multiple times, the predetermined UL signal may be a UL RS before the UE transmits the current UL RS. For example, the reception timings of respective DL signals serving as references of respective UL RSs may be different. For example, a DL RS corresponding to a UL RS to be currently transmitted may be a DL signal configured as a reference immediately prior to a UL RS to be currently transmitted.

The size of bits is exemplary, and various embodiments are not limited thereto. According to various embodiments, bits related to whether there is a change in the DL reception timing may have various values in addition to one bit. For example, the bits having a first value may correspond/be mapped to non-change (and/or change) in the DL reception timing, and the bits having a second value may correspond/be mapped to change (and/or non-change) in the DL reception timing. For example, the bits having a value other than the first value and the second value may correspond/be mapped to the case in which the bits have been reserved and/or may be used to transmit other information to the network. As another example, the bits may be transmitted/received always as a value mapped to the case in which the configured/indicated TA value has been used without change (and/or has been used with change), other operations according to various embodiments may be performed when the configured/indicated TA value has been used with change (and/or has been used without change).

Method #2

For example, the UE may report the amount of change in the DL reception timing to the BS/location server/LMF.

Embodiment—Related to Panel

Figure 19:
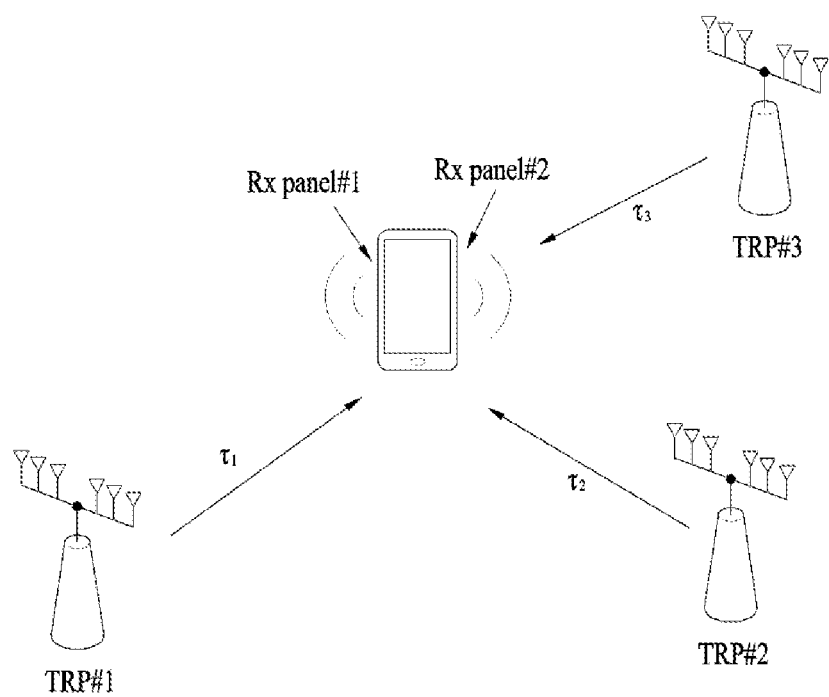
FIG. 19 is a diagram illustrating exemplary configurations of reception antenna panels of a UE according to various embodiments.

FIG. 19 is a diagram illustrating exemplary configurations of reception antenna panels of a UE according to various embodiments. Although only the reception (Rx) antenna panels of the UE are illustrated in FIG. 19, the UE may include transmission (Tx) antenna panels and/or both the Rx antenna panels and the Tx antenna panels. In a description of various embodiments, terms such as panel and antenna panel may be used interchangeably.

Referring to FIG. 19, the UE may have two Rx panels. For example, due to hardware implementation characteristics (e.g., group delay, etc.), each Rx panel may have an additional timing delay/error: $\tau_{RX_1}$ and/or $\tau_{RX_2}$ in addition to a propagation time. For example, FIG. 18 illustrates that the UE acquires an RSTD measurement for TRP #1 and TRP #3 and an RSTD measurement for TRP #2 and TRP #3.

- For example, when the UE measures/acquires an RSTD measurement for TRP #2 and TRP #3, the timing delays/errors of Rx panel #2 may offset each other due to use of Rx panel #2, and thus no error may occur in the RSTD measurement.
- For example, when the UE measures/acquires an RSTD measurement for TRP #1 and TRP #3, Rx panel #1 and Rx panel #2 may be used for the TRPs. Accordingly, for example, a delay/error occurring in the Rx panel in the RSTD measurement may be included.

According to various embodiments, the "panel" of the UE may be a group of multiple antenna elements.

According to various embodiments, the antenna panel/antenna group may be identified by a specific ID/index. Additionally/alternatively, according to various embodiments, the antenna panel/antenna group may be identified/distinguished by a specific UL RS (e.g., SRS) resource set ID. For example, a specific SRS resource set ID/index may identify a specific panel of the UE.

In the description of various embodiments, the panel of the UE may mean a panel for transmitting a signal (Tx panel) and/or a panel for receiving a signal (Rx panel).

For example, when the UE has a plurality of Tx/Rx panels, the Tx/Rx panels may have timing delay/errors due to, for example, characteristics of hardware implementation (e.g., group delay). Additionally/alternatively, for example, synchronization between the Tx/Rx panels may be problematic.

For example, if a TA is changed at every SRS period, a TA may be reported at every SRS period. For example, information about an effective/actual TA may be reported based on one or more of the above-described various embodiments.

For example, considering timing delay/errors of the antenna panels and synchronization between the antenna panels as described above, the effective/actual TA may vary depending on a Tx panel used by the UE to transmit an SRS. Accordingly, for example, information about the Tx panel used by the UE to transmit the SRS may be reported in addition to and/or separately from report of the information about the effective/actual TA based on one or more of the above-described various embodiments.

The use of an antenna panel of a UE applicable to various embodiments will be described.

For example, a panel of the UE suitable for each cell/BS/TRP may vary according to the orientation/position of the UE and/or the orientation/position of the cell/BS/TRP. Accordingly, for example, a specific panel of the UE suitable for signal transmission/reception with a specific cell/BS/TRP may be selectively used at a specific time. Additionally/alternatively, for example, antenna panels of the UE suitable for cells/BSs/TRPs may be simultaneously used for simultaneous wireless communication of the different cells/BSs/TRPs.

For example, when there is only one panel of the UE at a specific position, the beam direction that may be formed on the panel of the UE may not be suitable for a cell/BS/TRP that needs to transmit and receive a radio signal. That is, for example, a decrease in data transfer rate and/or a decrease in measurement accuracy between the UE and the cell/BS/TRP may be caused.

Therefore, for example, it may be necessary to mount multiple antenna panels at various positions (e.g., corners/faces) of the UE such as a smartphone. However, for example, timing delay may vary due to different lengths cables connected between different antenna panels and the modem. Therefore, for example, it may be necessary to overcome/compensate for such delay characteristics in UE positioning.

For example, even for the same TRP, a timing measurement related to positioning may vary for each panel of the UE due to a group delay, depending on the hardware characteristics of the antenna panel of the UE. Therefore, which antenna panel the UE uses to measure the reference timing may be important in positioning, and various embodiments may be considered as a solution.

In the description of various embodiments, a panel of the UE may be multiple antenna elements, and/or a group/configure of antenna elements mounted on the UE. For example, the panel of the UE may be a specific physical panel/antenna group. For example, for the panel of the UE, a logical bundle of multiple antennas may be used as one group. In the description of various embodiments, the panel of the UE may be expressed as an "antenna group" or an "antenna element" in addition to the "panel". According to various embodiments, a method of separating/distinguishing an antenna group by grouping antenna elements and assigning a specific identifier/ID thereto may be introduced. According to various embodiments, a plurality of antenna elements may be distributed into one or more groups, and the one or more groups may be identified/distinguished from each other by the specific identifier/ID.

Multiple Panels

Hereinafter, multiple panels (multi-panel) according to various embodiments will be described. For example, the various embodiments may be related to multi-panel operations/multi-panel definitions/multi-panel related details.

According to various embodiments, the term "panel" may refer to a group of multiple antenna elements.

Additionally/alternatively, in the description of various embodiments, the term "panel" may mean one or more panels (at least one panel and/or multiple panels) and/or a panel group (having a similarity/common value in terms of specific characteristics (e.g., TA, power control parameters, etc.)).

Additionally/alternatively, in the description of various embodiments, the term "panel" may mean one or more antenna ports (at least one antenna port and/or multiple antenna ports), an antenna port group, and/or a UL resource group/set (having a similarity/common value in terms of specific characteristics (e.g., TA, power control parameters, etc.) (e.g., when the difference between values related to the specific characteristic is within a predetermined range and/or below a predetermined threshold)).

Additionally/alternatively, in the description of various embodiments, the term "panel" may mean one or more beams (at least one beam and/or multiple beams), an antenna port group, and/or one or more beam groups/sets (at least one beam group/set and/or multiple beam groups/sets) (having a similarity/common value in terms of specific characteristics (e.g., TA, power control parameters, etc.)).

Additionally/alternatively, in the description of various embodiments, the term "panel" may be defined as a unit for the UE to configure/set a Tx/Rx beam. For example, the term "Tx panel" may be defined as a unit for using one beam among a plurality of Tx beams, which are generated by one panel, for transmission at a specific time. That is, only one Tx beam (e.g., spatial relation information RS) may be used for each Tx panel to transmit a specific UL signal/channel.

Additionally/alternatively, in the description of various embodiments, the term "panel" may mean one or more antenna ports (at least one antenna port and/or multiple antenna ports), an antenna port group, and/or a UL resource group/set having common/similar UL synchronization (e.g., when the difference in UL synchronization is less than or equal to a predetermined range/threshold).

Additionally/alternatively, in the description of various embodiments, the term "panel" may be replaced with an uplink synchronization unit (USU) in general.

Additionally/alternatively, in the description of various embodiments, the term "panel" may be replaced with an uplink transmission entity (UTE) in general.

Additionally/alternatively, in the description of various embodiments, the expression of "uplink resource (and/or resource group/set)" may be replaced with a PUSCH/PUCCH/SRS/PRACH resource (and/or resource group/set).

Additionally/alternatively, in the description of various embodiments, when it is said that something may be replaced, it may be interpreted to mean that the thing may be modified and applied, and vice versa. That is, in the description of various embodiments, when it is said that something may be modified and applied, it may be interpreted to mean that the thing may be modified and applied in reverse.

Additionally/alternatively, in the description of various embodiments, the term "antenna (and/or antenna port)" may refer to a physical and/or logical antenna (and/or antenna port).

Additionally/alternatively, in the description of various embodiments, the term "panel" may be variously interpreted as follows: a group of antenna elements of a UE, a group of antenna ports of a UE, and/or a group of logical antennas of a UE. For example, which physical/logical antennas and/or antenna ports are bundled and mapped to one panel may be determined in various ways by considering the location/distance/correlation/radio frequency (RF) configuration/antenna (port) virtualization between antennas. For example, such a mapping process may vary according to UE implementation.

Additionally/alternatively, in the description of various embodiments, the term "panel" may mean a plurality of panels and/or a panel group (having a similarity in terms of specific characteristics (e.g., when the difference between values related to the specific characteristic is within a predetermined range and/or below a predetermined threshold)).

Multi-Panel Structure

According to various embodiments, UE modeling where a plurality of panels (configured with one or more antennas) is mounted may be considered when the UE is implemented in high frequency bands. For example, two bi-directional panels may be considered in 3GPP UE antenna modeling.

According to various embodiments, various forms may be considered when implementing a plurality of UE panels. In the description of various embodiments, although it is assumed that the UE supports a plurality of panels, the embodiments may also be applied to a BS (e.g., TRP, etc.) supporting a plurality of panels.

According to various embodiments, the multi-panel structure may be applied when signals and/or channels are transmitted and received based on multiple panels.

Figure 20:
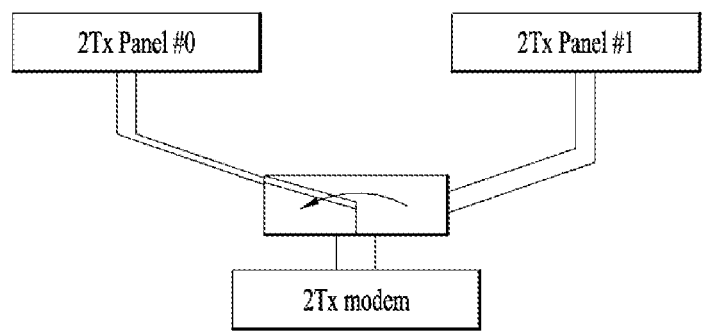
FIG. 20 is a diagram illustrating an exemplary multi-panel structure according to various embodiments.

FIG. 20 is a diagram illustrating an exemplary multi-panel structure according to various embodiments.

Referring to FIG. 20, according to various embodiments, the multi-panel structure may be implemented based on RF switching (multi-panel UE implementation based on RF switching).

For example, only one panel may be activated at one instance (a specific instance). To switch the activated panel (e.g., panel switching, etc.), signal transmission may not be allowed for a predetermined period of time.

Figure 21:
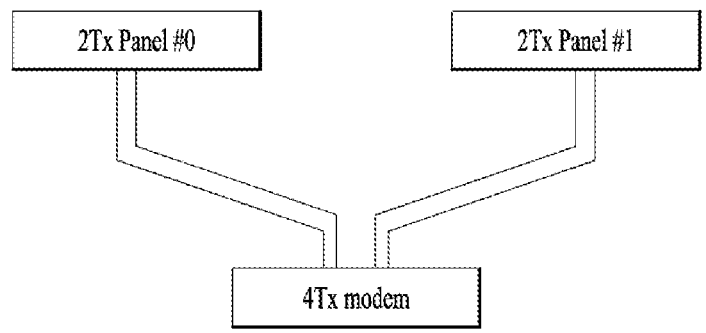
FIG. 21 is a diagram illustrating an exemplary multi-panel structure according to various embodiments.

FIG. 21 is a diagram illustrating an exemplary multi-panel structure according to various embodiments.

Referring to FIG. 21, according to various embodiments, the multi-panel structure may be implemented based on RF connection (multi-panel UE implementation based on RF connection).

For example, RF chains may be connected to each other so that each panel may be activated at any time (any time/always). For example, the time required for panel switching may be zero and/or very small (e.g., a time that may be approximated to 0, a time below a prescribed threshold, etc.). Depending on the configuration of a modem and/or power amplifier, a plurality of panels may be simultaneously activated to transmit signals (for example, simultaneous transmission across multiple panels (STxMP)).

When the UE has a plurality of panels, each panel may have a different radio channel state. Additionally/alternatively, each antenna panel may have a different RF/antenna configuration Therefore, there is a need for a method of estimating a channel for each panel.

For measurement of UL quality and/or management of UL beams and/or measurement of DL quality for each panel and/or management of DL beams based on channel reciprocity, a process in which one and/or a plurality of SRS resources are transmitted for each panel may be required. For example, the plurality of SRS resources may be SRS resources transmitted on different beams within one panel and/or SRS resources repeatedly transmitted on the same beam.

For convenience of description, a set of SRS resources transmitted on the same panel (e.g., based on specific usage parameters (e.g., beam management, antenna switching, codebook-based PUSCH, non-codebook based PUSCH, etc.) and specific time-domain behaviors (e.g., aperiodically, semi-persistently, and/or periodically) may be referred to as an SRS resource group. That is, the SRS resource group may correspond to a set of SRS resources supported in a wireless communication system to which various embodiments are applicable (e.g., NR system supporting Release 15, etc.). Additionally/alternatively, the SRS resource group may be separately configured by binding one and/or a plurality of SRS resources having the same time domain behavior and usage.

For the same usage and time domain behavior in the NR system supporting Release 15, a plurality of SRS resource sets may be configured only when the usage is beam management. For example, it may be defined that simultaneous transmission is not allowed on SRS resources configured in the same SRS resource set, but simultaneous transmission may be allowed between SRS resources belonging to different SRS resource sets. Accordingly, considering the panel implementation shown in FIG. 17 and/or simultaneous transmission on a plurality of panels, the concept of an SRS resource set may match an SRS resource group, but separate SRS resource groups may be defined in consideration of the implementation shown in FIG. 16 such as panel switching. For example, a specific ID may be given to each SRS resource, resources with the same ID may belong to the same SRS resource group, and resources with different IDs may belong to different resource groups.

For example, it may be assumed that the UE is configured with four SRS resource sets configured for BM (e.g., the RRC parameter usage is set to 'BeamManagement') (for convenience, the four SRS resource sets may be called SRS resource sets A, B, C, and D). Since a total of four (Tx) panels are implemented for the UE, it may be considered that SRS transmission is performed by matching each SRS resource set to one (Tx) panel. For example, a wireless communication system supporting Release-15, may support the UE implementation shown in Table 9.

TABLE 9

Add the following clarification to FG 2-30 that limit the number of SRS resource sets per supported time domain behaviour.

| Maximum number of SRS resource sets across all time domain behaviour (periodic/semi-persistent/aperiodic) reported in 2-30 | Additional constraint on the maximum number of SRS resource sets per supported time domain behaviour (periodic/semi-persistent/aperiodic) |
|---|---|
| 1 | 1 |
| 7 | 1 |
| 3 | 1 |
| 4 | 2 |
| 5 | 7 |
| 6 | 7 |
| 7 | 4 |
| 8 | 4 |

In Table 9, if the UE reports as its capability a value of 7 or 8 for feature groups (FG) 2 to 30, transmission may be performed as follows: a total of up to four SRS resource sets for BM (for each supported time-domain behavior) may be configured as shown in the right column, and one UE panel may correspond to each set for the transmission.

For example, when the four-panel UE performs transmission as follows: each panel corresponds to one SRS resource set for BM, the number of SRS resources configurable for each set may also be supported by separate UE capability signaling.

It may be assumed that two SRS resources are configured in each set. This may correspond to the number of UL beams capable of being transmitted per each panel. For example, when four panels are implemented, the UE may transmit two UL beams on two configured SRS resources for each panel.

In this case, in the wireless communication system supporting Release-15, either CB-based UL mode or NCB-based UL mode may be configured. For example, in the wireless communication system that supports Release-15, only a single SRS resource set (with usage set to "CB-based UL" or "NCB-based UL")), i.e., only one dedicated SRS resource set (for a PUSCH) may be supported regardless of cases/configurations.

MPUE (Multi-Panel UE) Category

According to various embodiments, the following three MPUE categories may be considered for the above-described multi-panel operation. According to various embodiments, the three MPUE categories may be divided according to at least one of (i) whether multiple panels are activated and/or (ii) whether transmission based on multiple panels is allowed.

MPUE Category 1

When the UE has multiple panels implemented therein, the UE may activate only one panel at a time. For example, the delay for panel switching/activation may be set to [X] ms (where X is a real number, an integer greater than or equal to 0, an integer, and/or a natural number). The delay may be set longer than the delay for beam switching/activation and configured in units of symbols and/or slots. MPUE category 1 may be replaced with MPUE-assumption 1.

MPUE Category 2

When the UE has multiple panels implemented therein, the UE may activate the multiple panels at a time and use one or more panels for transmission. For example, simultaneous transmission based on panels may be allowed in the corresponding category. MPUE category 2 may be replaced with MPUE-assumption2.

MPUE Category 3

When the UE has multiple panels implemented therein, the UE may activate the multiple panels at a time but use only one panel for transmission. MPUE category 3 may be replaced with MPUE-assumption3.

According to various embodiments, one or more of the above-described three MPUE categories may be supported for transmission/reception of signals and/or channels based on multiple panels.

For example, MPUE category 3 among the three MPUE categories may be (optionally) supported in the wireless communication system supporting Release-16.

For example, information on the MPUE category may be predefined by standards (specifications). Accordingly, the information on the MPUE category may be known in advance by the UE and/or the network without separate configuration/indication.

Additionally/alternatively, the information on the MPUE category may be indicated/configured semi-statically or dynamically depending on the state of the system (e.g., from the perspective of the network and/or UE). The configuration/indication related to transmission/reception of signals and/or channels based on multiple panels may be configured/indicated in consideration of the MPUE category.

Configuration/Indication Related to Panel-Specific Transmission/Reception

According to various embodiments, transmission/reception of signals and/or channels may be performed panel-specifically. Panel-specific transmission/reception may mean that transmission/reception of signals and/or channels are performed in units of panels. For example, panel-specific transmission/reception may be referred to as panel-selective transmission/reception.

According to various embodiments, identification information (e.g., identifier (ID), indicator, etc.) may be used for panel-specific transmission/reception in operation based on multiple panels. Hereinafter, a panel ID will be described as an example of identification information for configuring and/or indicating a panel, but this may be replaced with identification information, an indicator, etc.

For example, the ID of a panel among a plurality of activated panels may be used for panel-selective transmission of a PUSCH, a PUCCH, an SRS, and/or a PRACH.

According to various embodiments, the panel ID may be configured/defined based on at least one of the following four alternatives (Alts. 1, 2, 3, and 4).

Alt. 1

According to various embodiments, the panel ID may be an SRS resource set ID.

For example, considering the following cases: a) when SRS resources in several SRS resource sets having the same time-domain operation are simultaneously transmitted in the same BWP, b) when a power control parameter is configured in units of SRS resource sets, c) when the UE supports a maximum of four SRS resource sets (corresponding to up to four panels) depending on the supported time-domain operation, each UE Tx panel may correspond to an SRS resource set configured in terms of the UE implementation.

For Alt. 1, the SRS resource set associated with each panel may be used for PUSCH transmission based on 'codebook' and 'non-codebook'.

For Alt. 1, several SRS resources belonging to several SRS resource sets may be selected by extending the SRI field of DCI.

For example, an SRI-to-SRS resource mapping table may need to be extended to include SRS resources in all the SRS resource sets.

Alt. 2

According to various embodiments, the panel ID may be an ID (directly) associated with a reference RS resource and/or reference RS resource set.

Alt. 3

According to various embodiments, the panel ID may be an ID (directly) associated with a target RS resource and/or target RS resource set.

For Alt. 3, a configured SRS resource set corresponding to one UE Tx panel may be easily controlled, and the same panel ID may be assigned to multiple SRS resource sets with different time-domain operations.

Alt. 4

According to various embodiments, the panel ID may be an ID additionally configured for spatial relation information (e.g., RRC SpatialRelationInfo).

Alt. 4 may correspond to a method of newly adding information for indicating the panel ID. For example, in this case, a configured SRS resource set corresponding to one UE Tx panel may be easily controlled, and the same panel ID may be assigned to multiple SRS resource sets with different time-domain operations.

For example, a UL TCI may be introduced in relation to a DL TCI. UL TCI state definitions may include a list of reference RS resources (e.g., SRS, CSI-RS, and/or SSB). For example, the SRI field may be reused to select a UL TCI state from the configured set, and/or a new DCI field (e.g., UL-TCI field) in DCI (e.g., DCI format 0_1) may be defined for the same purpose.

According to various embodiments, the above-described panel-specific transmission/reception related information (e.g., panel ID, etc.) may be provided by higher layer signaling (e.g., RRC message, MAC-CE, etc.) and/or lower layer signaling (e.g., L1 signaling, DCI, etc.). According to various embodiments, the corresponding information may be transmitted from the BS (and/or network node) to the UE and/or from the UE to the BS (and/or network node) according to circumstances or needs.

Additionally/alternatively, according to various embodiments, the corresponding information may be configured in a hierarchical manner as follows: a set of candidates are first configured and then specific information is indicated.

Additionally/alternatively, according to various embodiments, the above-described panel related identification information may be configured in units of a single panel and/or in units of multiple panels (e.g., panel group, panel set, etc.).

Figure 22:
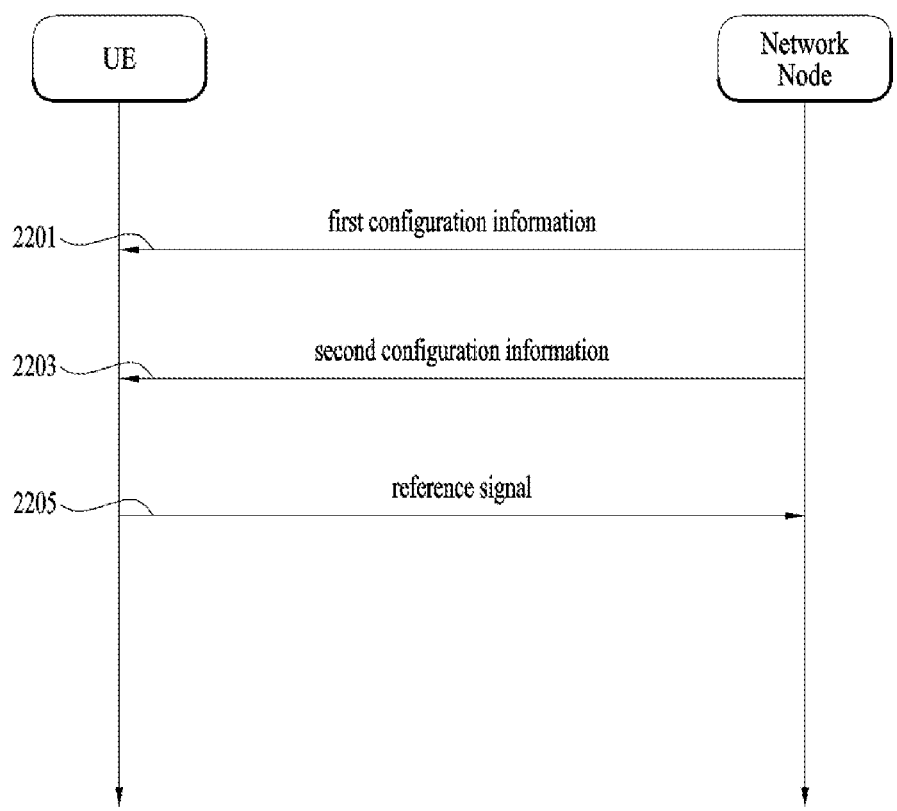
FIG. 22 is a diagram schematically illustrating a method of operating a UE and a network node according to various embodiments.

FIG. 22 is a simplified diagram illustrating a method of operating a UE and network nodes according to various embodiments.

Figure 23:
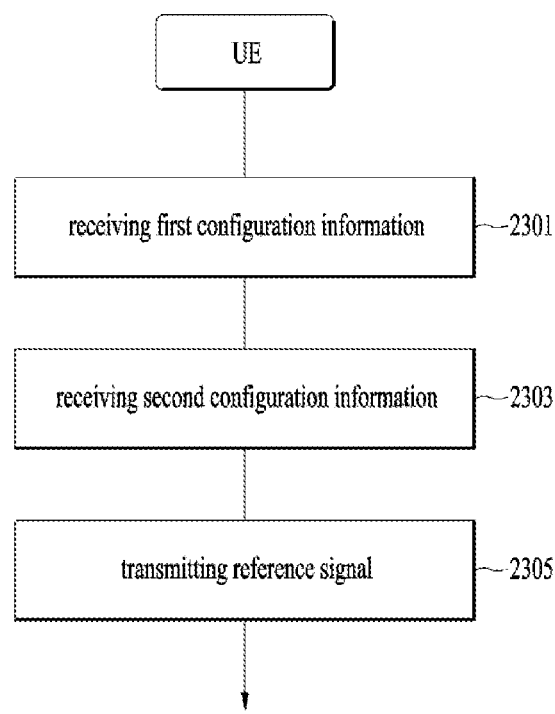
FIG. 23 is a flowchart illustrating a method of operating a UE according to various embodiments.

FIG. 23 is a flowchart illustrating a method of operating a UE according to various embodiments.

Figure 24:
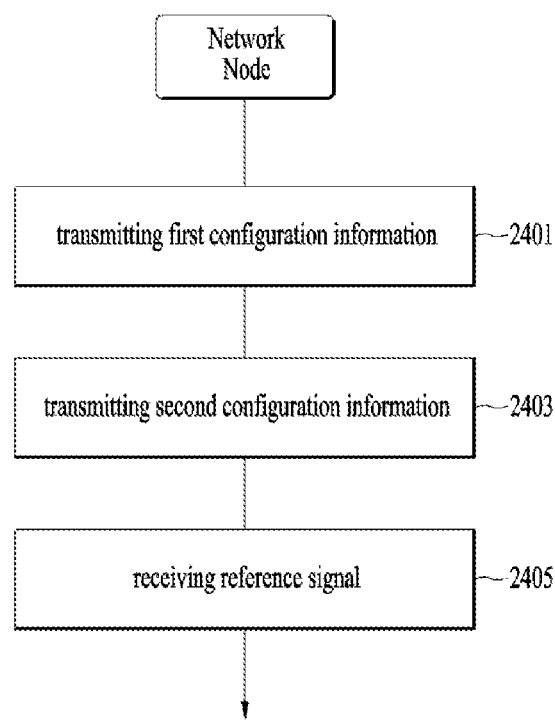
FIG. 24 is a flowchart illustrating a method of operating a network node according to various embodiments.

FIG. 24 is a flowchart illustrating a method of operating a network node according to various embodiments. For example, the network node may be a TP and/or a BS and/or a cell and/or a location server and/or an LMF and/or any device performing the same operation.

Referring to FIGS. 22 to 24, in operations 2201, 2301, and 2401 according to various embodiments, the network node may transmit first configuration information related to a first TA, and the UE may receive the first configuration information.

In operations 2203, 2303, and 2403 according to various embodiments, the network node may transmit second configuration information related to an RS for positioning, and the UE may receive the second configuration information.

In operations 2204, 2304, and 2404 according to various embodiments, the UE may transmit the RS at a UL transmission timing based on the second configuration information. According to various embodiments, the UL transmission timing may be related to a second TA.

According to various embodiments, the second configuration information may include at least one of information related to an RS resource or information related to an RS resource set.

According to various embodiments, information related to the second TA may be transmitted based on comparison between the first TA and the second TA.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments 4.1. Exemplary Configurations of Devices to which Various Embodiments are Applied FIG. 25 is a diagram illustrating a device that implements various embodiments.

Figure 25:
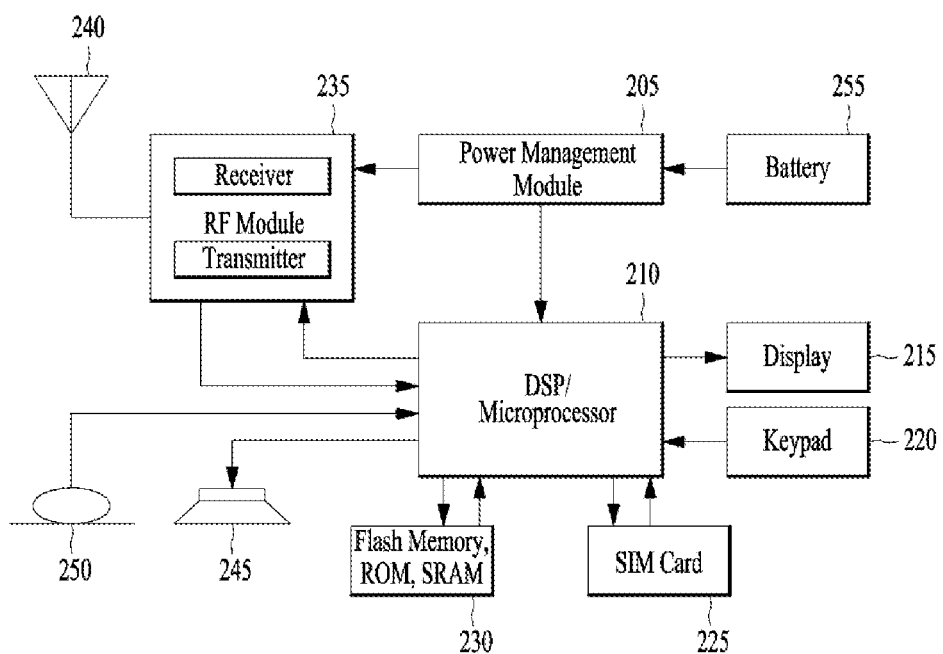
FIG. 25 is a block diagram illustrating an apparatus for implementing various embodiments of the present disclosure.

The device illustrated in FIG. 25 may be a UE and/or a BS (e.g., eNB or gNB or TP) and/or a location server (or LMF) which is adapted to perform the above-described mechanism, or any device performing the same operation.

Referring to FIG. 25, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 25 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 25 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, the one or more processors included in the UE (or one or more processors of the communication device included in the UE) may receive first configuration information related to a first TA.

According to various embodiments, the one or more processors included in the UE may receive second configuration information related to an RS for positioning.

According to various embodiments, the second configuration information may include at least one of (i) information related to an RS resource or (ii) information related to an RS resource set.

According to various embodiments, the one or more processors included in the UE may transmit the RS at a UL transmission timing based on the second configuration information.

According to various embodiments, based on comparison between the first TA and a second TA related to the UL transmission timing, information related to the second TA may be transmitted.

According to various embodiments, the information related to the second TA may include information about a difference value between the first TA and the second TA.

According to various embodiments, the RS may be a plurality of periodically or semi-persistently transmitted RSs.

According to various embodiments, the second TA may be a plurality of second TAs obtained with respect to the plurality of RSs.

According to various embodiments, at least one of information about an RS resource of an RS related to each of the plural second TAs or the information about the RS resource set may be transmitted.

According to various embodiments, the second TA may be obtained in the same manner as the first TA, based on (i) obtaining of a time window related to maintenance of a TA and (ii) the UL transmission timing being included in the time window.

According to various embodiments, at least one of (i) the RS resource being a plurality of RS resources or (ii) the RS resource set being a plurality of RS resource sets may be satisfied.

According to various embodiments, one of more of (i) obtaining of the time window for the plural RS resources or (ii) obtaining of the time window for the plurality of RS resource sets may be satisfied.

According to various embodiments, the one or more processors included in the UE may receive information related to a TA command for updating the first TA.

According to various embodiments, the TA command may be disregarded for transmission of the RS, based on (i) obtaining of the time window and (ii) the UL transmission timing being included in the time window.

According to various embodiments, the information related to the second TA may include a first bit field as to whether the first TA is equal to the second TA, based on reception of a confirmation request as to whether the first TA is equal to the second TA.

According to various embodiments, the first bit field having a first value may be mapped to a case in which the first TA is equal to the second TA.

According to various embodiments, the first bit field having a second value may be mapped to a case in which the first TA is different from the second TA.

According to various embodiments, the UL transmission timing may be obtained based on a DL reception timing and the second TA.

According to various embodiments, information including a second bit field as to whether the DL reception timing is changed may be transmitted.

According to various embodiments, the second bit field having a first value may be mapped to a case in which the DL reception timing is not changed.

According to various embodiments, the second field having a second value may be mapped to a case in which the DL reception timing is changed.

According to various embodiments, one or more processors included in a network node (or one or more processors of a communication device included in the network node) may transmit first configuration information related to a first TA.

According to various embodiments, the one or more processors included in the network node may transmit second configuration information related to an RS for positioning.

According to various embodiments, the second configuration information may include at least one of (i) information related to an RS resource or (ii) information related to an RS resource set.

According to various embodiments, the one or more processors included in the network node may receive the RS related to a UL transmission timing and the second configuration information.

According to various embodiments, based on comparison between the first TA and a second TA related to the UL transmission timing, information related to the second TA may be received.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 26:
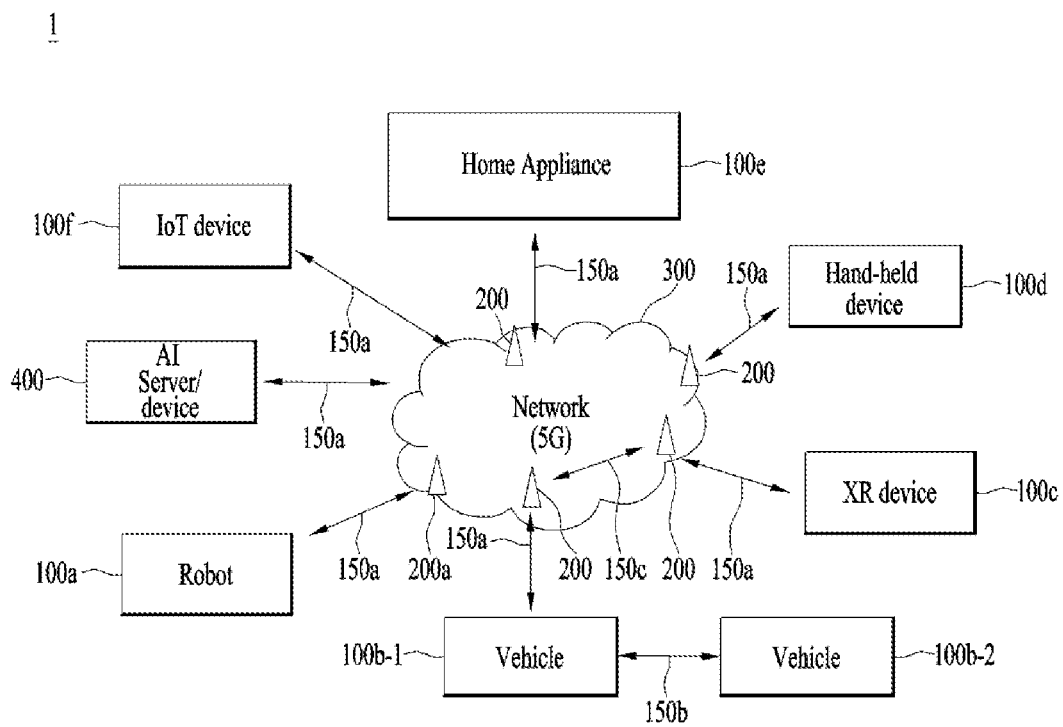
FIG. 26 illustrates an exemplary communication system to which various embodiments of the present disclosure are applied.

FIG. 26 illustrates an exemplary communication system to which various embodiments of the present disclosure are applied.

Referring to FIG. 26, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 27:
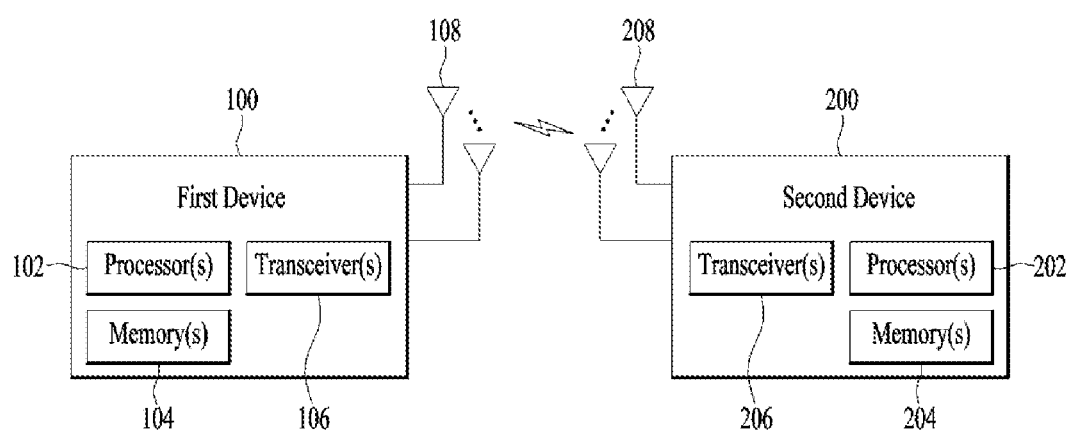
FIG. 27 illustrates exemplary wireless devices to which various embodiments of the present disclosure are applicable.

Example of Wireless Devices to which Various Embodiments of the Present Disclosure are Applied FIG. 27 illustrates exemplary wireless devices to which various embodiments of the present disclosure are applicable.

Referring to FIG. 27, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 28:
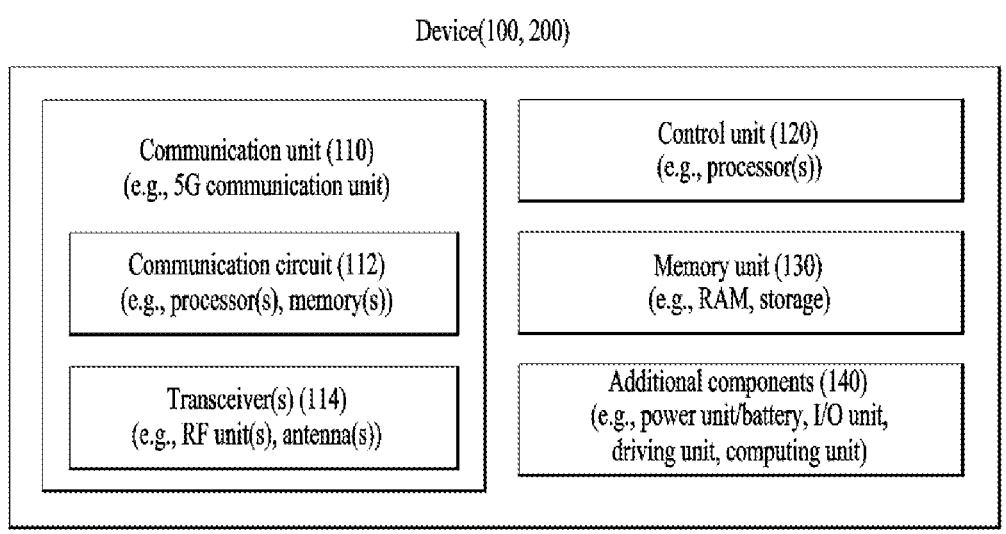
FIG. 28 illustrates other exemplary wireless devices to which various embodiments of the present disclosure are applied.

Example of Using Wireless Devices to which Various Embodiments of the Present Disclosure are Applied FIG. 28 illustrates other exemplary wireless devices to which various embodiments of the present disclosure are applied. The wireless devices may be implemented in various forms according to a use case/service (see FIG. 26).

Referring to FIG. 28, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 28 will be described in detail with reference to the drawings.

Figure 29:
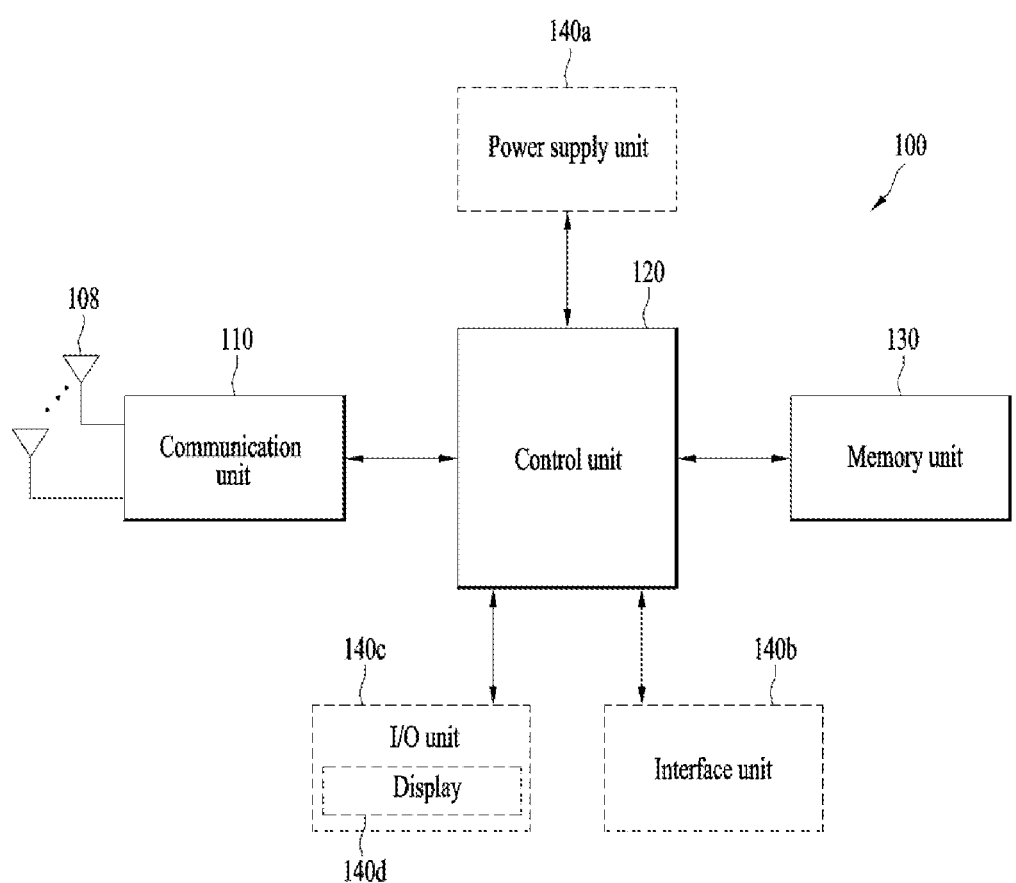
FIG. 29 illustrates an exemplary portable device to which various embodiments of the present disclosure are applied.

Example of Portable Device to which Various Embodiments of the Present Disclosure are Applied FIG. 29 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 29, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the obtained information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 30:
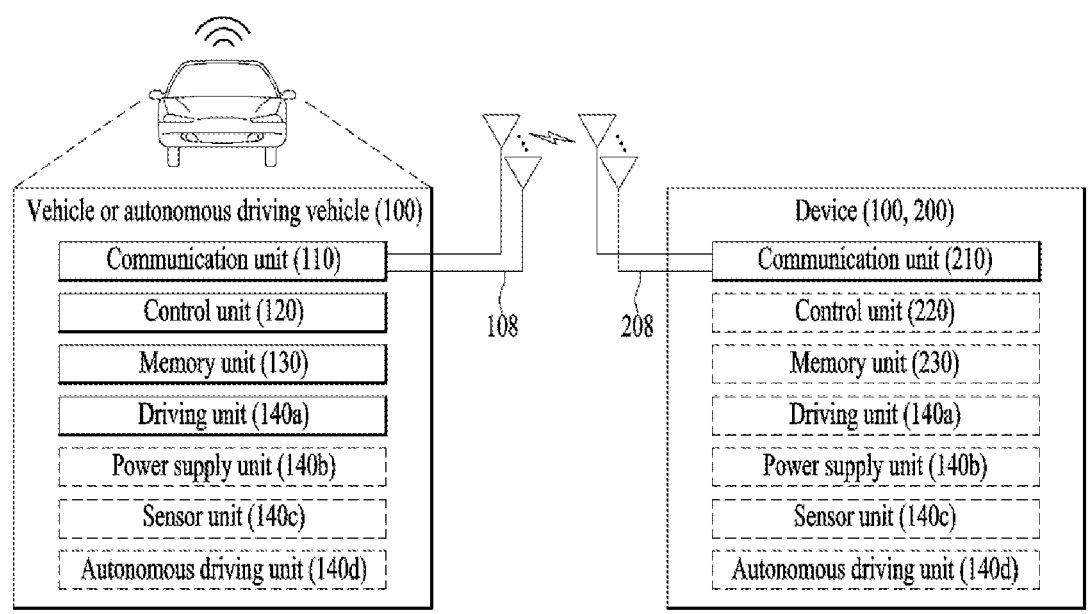
FIG. 30 illustrates an exemplary vehicle or autonomous driving vehicle to which various embodiments of the present disclosure are applied.

Example of Vehicle or Autonomous Driving Vehicle to which Various Embodiments of the Present Disclosure FIG. 30 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 30, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MINI-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by an apparatus in a wireless communication system, the method comprising:
   receiving first configuration information related to a first timing advance (TA);
   receiving second configuration information related to a reference signal (RS) for positioning, wherein the second configuration information includes at least one of (i) information related to an RS resource or (ii) information related to an RS resource set; and
   transmitting the RS at an uplink (UL) transmission timing based on the second configuration information,
   wherein, based on comparison between the first TA and a second TA related to the UL transmission timing, information related to the second TA is transmitted.

2. The method of claim 1, wherein the information related to the second TA includes information about a difference value between the first TA and the second TA.

3. The method of claim 1,
   wherein the RS is a plurality of periodically or semi-persistently transmitted RSs and the second TA is a plurality of second TAs obtained with respect to the plurality of RSs, and
   at least one of information about an RS resource of an RS related to each of the plural second TAs or the information about the RS resource set is transmitted.

4. The method of claim 1, wherein the second TA is obtained in the same manner as the first TA, based on: (i) obtaining of a time window related to maintenance of a TA and (ii) the UL transmission timing being included in the time window.

5. The method of claim 4,
   wherein at least one of: (i) the RS resource being a plurality of RS resources or (ii) the RS resource set being a plurality of RS resource sets; is satisfied, and wherein at least one of: (i) obtaining of the time window for the plural RS resources or (ii) obtaining of the time window for the plurality of RS resource sets; is satisfied.

6. The method of claim 4, further comprising receiving information related to a TA command for updating the first TA, wherein the TA command is disregarded for transmission of the RS, based on (i) obtaining of the time window and (ii) the UL transmission timing being included in the time window.

7. The method of claim 1, wherein the information related to the second TA includes a first bit field as to whether the first TA is equal to the second TA, based on reception of a confirmation request as to whether the first TA is equal to the second TA, the first bit field having a first value is mapped to a case in which the first TA is equal to the second TA, and the first bit field having a second value is mapped to a case in which the first TA is different from the second TA.

8. The method of claim 1, wherein the UL transmission timing is obtained based on a downlink (DL) reception timing and the second TA, information including a second bit field as to whether the DL reception timing is changed is transmitted, the second bit field having a first value is mapped to a case in which the DL reception timing is not changed, and the second field having a second value is mapped to a case in which the DL reception timing is changed.

9. A user equipment (UE) operating in a wireless communication system, the UE comprising:

a transceiver; and one or more processors connected to the transceiver, wherein the one or more processors are configured to:

receive first configuration information related to a first timing advance (TA);

receive second configuration information related to a reference signal (RS) for positioning, wherein the second configuration information includes at least one of (i) information related to an RS resource or (ii) information related to an RS resource set; and transmit the RS at an uplink (UL) transmission timing based on the second configuration information, and wherein, based on comparison between the first TA and a second TA related to the UL transmission timing, information related to the second TA is transmitted.

10. The UE of claim 9, wherein the second TA is obtained in the same manner as the first TA, based on obtaining of a time window related to maintenance of a TA and (ii) the UL transmission timing being included in the time window.

11. The UE of claim 9, wherein the one or more processors are configured to communicate with one or more of a UE, a network, and an autonomous driving vehicle other than a vehicle in which the UE is included.

12. A method performed by an apparatus in a wireless communication system, the method comprising:

transmitting first configuration information related to a first timing advance (TA);

transmitting second configuration information related to a reference signal (RS) for positioning, wherein the second configuration information includes at least one of (i) information related to an RS resource or (ii) information related to an RS resource set; and receiving the RS related to an uplink (UL) transmission timing and the second configuration information, wherein, based on comparison between the first TA and a second TA related to the UL transmission timing, information related to the second TA is received.

13. A base station operating in a wireless communication system, the base station comprising:

a transceiver; and one or more processors connected to the transceiver, wherein the one or more processors are configured to:

transmit first configuration information related to a first timing advance (TA);

transmit second configuration information related to a reference signal (RS) for positioning, wherein the second configuration information includes at least one of (i) information related to an RS resource or (ii) information related to an RS resource set; and receive the RS related to an uplink (UL) transmission timing and the second configuration information, and wherein, based on comparison between the first TA and a second TA related to the UL transmission timing, information related to the second TA is received.

* * * * *